US012713007B2

(12) United States Patent
Kim et al.

(10) Patent No.: US 12,713,007 B2
(45) Date of Patent: Aug. 18, 2026

(54) INTER PREDICTION METHOD AND APPARATUS USING SECONDARY LIST

(71) Applicant: LG Electronics Inc., Seoul (KR)

(72) Inventors: Seunghwan Kim, Seoul (KR); Seethal Paluri, Seoul (KR); Jie Zhao, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/727,021

(22) PCT Filed: Jan. 6, 2023

(86) PCT No.: PCT/KR2023/000273
§ 371 (c)(1),
(2) Date: Jul. 5, 2024

(87) PCT Pub. No.: WO2023/132679
PCT Pub. Date: Jul. 13, 2023

(65) Prior Publication Data

US 2025/0126240 A1 Apr. 17, 2025

Related U.S. Application Data

(60) Provisional application No. 63/297,175, filed on Jan. 6, 2022.

(51) Int. Cl.
*H04N 19/105* (2014.01)
*H04N 19/159* (2014.01)
(Continued)

(52) U.S. Cl.
CPC ......... *H04N 19/105* (2014.11); *H04N 19/159* (2014.11); *H04N 19/176* (2014.11); *H04N 19/577* (2014.11)

(58) Field of Classification Search
None
See application file for complete search history.

(56) References Cited

U.S. PATENT DOCUMENTS

2014/0301461 A1* 10/2014 Jeon .................... H04N 19/119 375/240.12
2021/0392364 A1 12/2021 Chiang et al.
(Continued)

FOREIGN PATENT DOCUMENTS

EP 3547687 A2 10/2019
EP 3836545 A1 6/2021

OTHER PUBLICATIONS

Bross et al., "Versatile Video Coding (Draft 10)," Joint Video Experts Team (JVET) of ITU-T SG 16 WP 3 and ISO/IEC JTC 1/SC 29/WG 11, 19th Meeting: by teleconference, JVET-S2001-vH, Jun. 2020, 548 pages.

(Continued)

*Primary Examiner* — Christopher G Findley
(74) *Attorney, Agent, or Firm* — Fish & Richardson P.C.

(57) ABSTRACT

According to a present disclosure, an image decoding method performed by a decoding apparatus, the image decoding method comprising obtaining image information including inter prediction-related information of a current block from a bitstream; configuring at least one of a merge list of the current block and an advanced motion vector prediction (AMVP) list of the current block for inter prediction; deriving motion information of the current block on the basis of the at least one of the merge list of the current block and the AMVP list of the current block; generating prediction samples for the current block based on the motion information of the current block; and generating reconstruction samples for the current block based on the prediction samples for the current block, wherein the merge list (Continued)

includes at least one of a primary merge list and a secondary merge list (SML).

19 Claims, 14 Drawing Sheets

(51) Int. Cl.
*H04N 19/176* (2014.01)
*H04N 19/577* (2014.01)

(56) References Cited

U.S. PATENT DOCUMENTS

2022/0239899 A1* 7/2022 Zhang .................... H04N 19/46
2022/0256189 A1* 8/2022 Lee ...................... H04N 19/513

OTHER PUBLICATIONS

Chen et al., "Algorithm description for Versatile Video Coding and Test Model 10 (VTM 10)," Joint Video Experts Team (JVET) of ITU-T SG 16 WP 3 and ISO/IEC JTC 1/SC 29/WG 11, 19th Meeting: by teleconference, JVET-S2002-v1, Jun. 2020, 97 pages.
Coban et al., "Algorithm description of Enhanced Compression Model 2 (ECM 2)," Joint Video Experts Team (JVET) of ITU-T SG 16 WP 3 and ISO/IEC JTC 1/SC 29, 23rd Meeting, by teleconference, JVET-W2025, Jul. 2021, 22 pages.
Extended European Search Report in European Appln. No. 23737427.7, mailed on Oct. 21, 2025, 14 pages.
Zhang et al., "EE2-3.1/EE2-3.2: Adaptive Reordering of Merge Candidates with Template/Bilateral Matching," Joint Video Experts Team (JVET) of ITU-T SG 16 WP3 and ISO/IEC JTC 1/SC 29, 23rd Meeting, by teleconference, JVET-W0090-v2, Jul. 2021, 5 pages.
Zhao et al., "Non-EE2: Template Matching Based Merge Candidate List Construction (TM-MCLC)," Joint Video Experts Team (JVET) of ITU-T SG 16 WP3 and ISO/IEC JTC 1/SC 29, 24th Meeting, by teleconference, JVET-X0087-v2, Oct. 2021, 3 pages.

* cited by examiner

INTER PREDICTION METHOD AND APPARATUS USING SECONDARY LIST

CROSS-REFERENCE TO RELATED APPLICATIONS

This application is a National Stage application under 35 U.S.C. § 371 of International Application No. PCT/KR2023/000273, filed on Jan. 6, 2023, which claims the benefit of U.S. Provisional Application No. 63/297,175, filed on Jan. 6, 2022. The disclosures of the prior applications are incorporated by reference in their entirety.

BACKGROUND OF DISCLOSURE

Field of the Disclosure

The present document relates to an image coding technology, and more particularly, to a device and method for coding an inter prediction mode in an image coding system.

Related Art

Recently, demand for high-resolution, high-quality image/video has increased in various fields. As image/video data has high resolution and high quality, the amount of information or bits to be transmitted increases relative to the existing image/video data, and thus, transmitting image data using a medium such as an existing wired/wireless broadband line or an existing storage medium or storing image/video data using existing storage medium increase transmission cost and storage cost.

In addition, interest and demand for immersive media such as virtual reality (VR) and artificial reality (AR) content or holograms has recently increased and broadcasting for image/video is having characteristics different from reality images such as game images has increased.

Accordingly, a highly efficient image/video compression technology is required to effectively compress, transmit, store, and reproduce information of a high-resolution, high-quality image/video having various characteristics as described above.

In addition, in connection with image/video coding technologies, there have been discussions of techniques for extending a merge list and an advanced motion vector prediction (AMVP) list to improve the accuracy of inter predictions. To efficiently apply these techniques, a method of efficiently signaling related information is necessary.

SUMMARY THE DISCLOSURE

According to one embodiment of the present document, there is provided an image decoding method performed by a decoding apparatus. The image decoding method comprising obtaining image information including inter prediction-related information of a current block from a bitstream; configuring at least one of a merge list of the current block and an advanced motion vector prediction (AMVP) list of the current block for inter prediction; deriving motion information of the current block on the basis of the at least one of the merge list of the current block and the AMVP list of the current block; generating prediction samples for the current block based on the motion information of the current block; and generating reconstruction samples for the current block based on the prediction samples for the current block, wherein the merge list includes at least one of a primary merge list and a secondary merge list (SML).

According to another embodiment of the present document, there is provided an image encoding method performed by an encoding apparatus. The image encoding method comprising configuring at least one of a merge list of a current block and an advanced motion vector prediction (AMVP) list of the current block; deriving motion information of the current block on the basis of the at least one of the merge list of the current block and the AMVP list of the current block; generating prediction samples for the current block on the basis of the motion information of the current block; generating residual information based on the prediction samples of the current block; and encoding image information including the residual information, wherein the merge list includes at least one of a primary merge list and a secondary merge list (SML).

According to another embodiment of the present document, there is provided a computer-readable digital storage medium. The computer-readable storage medium stores a bitstream generated using a particular method, the particular method comprising configuring at least one of a merge list of a current block and an advanced motion vector prediction (AMVP) list of the current block; deriving motion information of the current block on the basis of the at least one of the merge list of the current block and the AMVP list of the current block; generating prediction samples for the current block on the basis of the motion information of the current block; generating residual information based on the prediction samples of the current block; and encoding image information including the residual information, wherein the merge list includes at least one of a primary merge list and a secondary merge list (SML).

According to another embodiment of the present document, there is provided a method of transmitting data of an image. The transmission method comprising obtaining a bitstream of the image, wherein the bitstream is generated based on configuring at least one of a merge list of a current block and an advanced motion vector prediction (AMVP) list of the current block, deriving motion information of the current block on the basis of the at least one of the merge list of the current block and the AMVP list of the current block, generating prediction samples for the current block on the basis of the motion information of the current block, generating residual information on the basis of the prediction samples of the current block and encoding image information including the residual information, and transmitting the data including the bitstream, wherein the merge list includes at least one of a primary merge list and a secondary merge list (SML).

According to another embodiment of the present document, there is provided a computer-readable digital storage medium in which encoded information or encoded video/image information, causing to perform the video/image decoding method disclosed in at least one of the embodiments of the present document by the decoding apparatus, is stored.

According to another embodiment of the present document, there is provided a method and an apparatus for transmitting a bitstream generated by a video/image encoding method disclosed in at least one of the embodiments of the present document.

DESCRIPTION OF EMBODIMENTS

Figure 1:
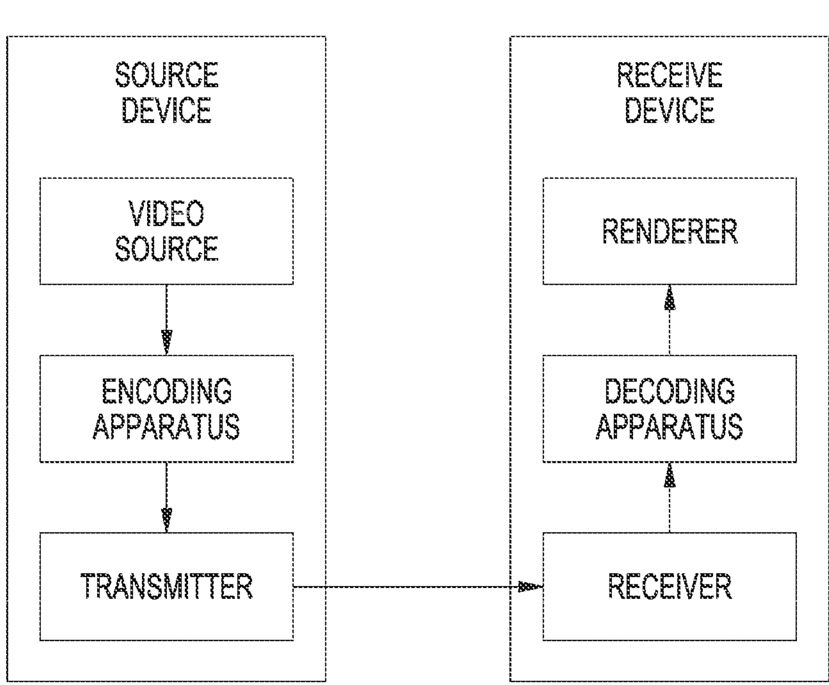
FIG. 1 illustrates an example of a video/image coding system to which embodiments of the present specification may be applied.

The present document may be modified in various forms, and specific embodiments thereof will be described and shown in the drawings. However, the embodiments are not intended for limiting the present document. The terms used in the following description are used to merely describe specific embodiments but are not intended to limit the present document. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Each of the components in the drawings described in the present document are illustrated independently for the convenience of description regarding different characteristic functions, and do not mean that the components are implemented in separate hardware or separate software. For example, two or more of each configuration may be combined to form one configuration, or one configuration may be divided into a plurality of configurations. Embodiments in which each configuration is integrated and/or separated are also included in the scope of the present document without departing from the spirit of the present document.

Hereinafter, exemplary embodiments of the present document will be described in detail with reference to the accompanying drawings. Hereinafter, the same reference numerals are used for the same components in the drawings, and redundant description of the same components is omitted.

The present document relates to video/image coding. For example, a method/embodiment disclosed in the present document may be related to a versatile video coding (VVC) standard (ITU-T Rec. H.266), the next-generation video/image coding standard after VVC, or other video coding-related standards (e.g., High Efficiency Video Coding (HEVC) standard, ITU-T Rec. H.265 standard, essential video coding (EVC) standard, AVS2 standard, or the like).

The present document relates to video/image coding. For example, a method/embodiment disclosed in the present document may be applied to a method disclosed in the versatile video coding (VVC) standard, the essential video coding (EVC) standard, the AOMedia Video 1 (AV1) standard, the 2nd generation of audio video coding standard (AVS2) or the next generation video/image coding standard (e.g., H.267, H.268, or the like).

The present document suggests various embodiments of video/image coding, and the above embodiments may also be performed in combination with each other unless otherwise specified.

In the present disclosure, a "video" may mean a set of images in a series according to the passage of time. A "picture" generally means the basis representing one image in a particular time period, and a subpicture/slice/tile is a basis constituting a part of a picture in coding. One picture may be composed of one or more tile groups. One tile group may include one or more tiles. A brick may refer to a quadrangular area of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. In addition, sub-pictures may indicate the quadrangular regions of one or more slices in a picture. In other words, sub-pictures may include one or more slices that cover the entire rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. The tile group and the slice may be used interchangeably in the present document. For example, in the present document, the tile group/tile group header may be referred to as a slice/slice header.

A pixel or a pel may mean a smallest unit constituting one picture (or image). In addition, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present document, "A or B" may mean "only A", "only B" or "both A and B". In other words, "A or B" in the present document may be interpreted as "A and/or B". For example, in the present document "A, B or C (A, B or C)" means "only A", "only B", "only C", or "any combination of A, B and C".

A slash (/) or comma (comma) used in the present document may mean "and/or". For example, "A/B" may mean "A and/or B". Accordingly, "A/B" may mean "only A", "only B", or "both A and B". For example, "A, B, C" may mean "A, B, or C".

In the present document, "at least one of A and B" may mean "only A", "only B" or "both A and B". Also, in the present document, the expression "at least one of A or B" or "at least one of A and/or B" may be interpreted the same as "at least one of A and B".

Also, in the present document, "at least one of A, B and C" means "only A", "only B", "only C", or "any combination of A, B and C". Also, "at least one of A, B or C" or "at least one of A, B and/or C" may mean "at least one of A, B and C".

Also, parentheses used in the present document may mean "for example". Specifically, when "prediction (intra prediction)" is indicated, "intra prediction" may be proposed as an example of "prediction". In other words, "prediction" in the present document is not limited to "intra prediction", and "intra prediction" may be proposed as an example of "prediction". Also, even when "prediction (i.e., intra prediction)" is indicated, "intra prediction" may be proposed as an example of "prediction".

Technical features that are individually described in one drawing in the present document may be implemented individually or simultaneously.

The following drawings are provided to describe specific examples of the present document. The specific names of devices in the drawings or the specific names of signals/messages/fields are illustrative, and the technical features of the present document are not limited to the specific names used in the following drawings.

FIG. 1 illustrates an example of a video/image coding system to which embodiments of the present specification may be applied.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The reception device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may obtain video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
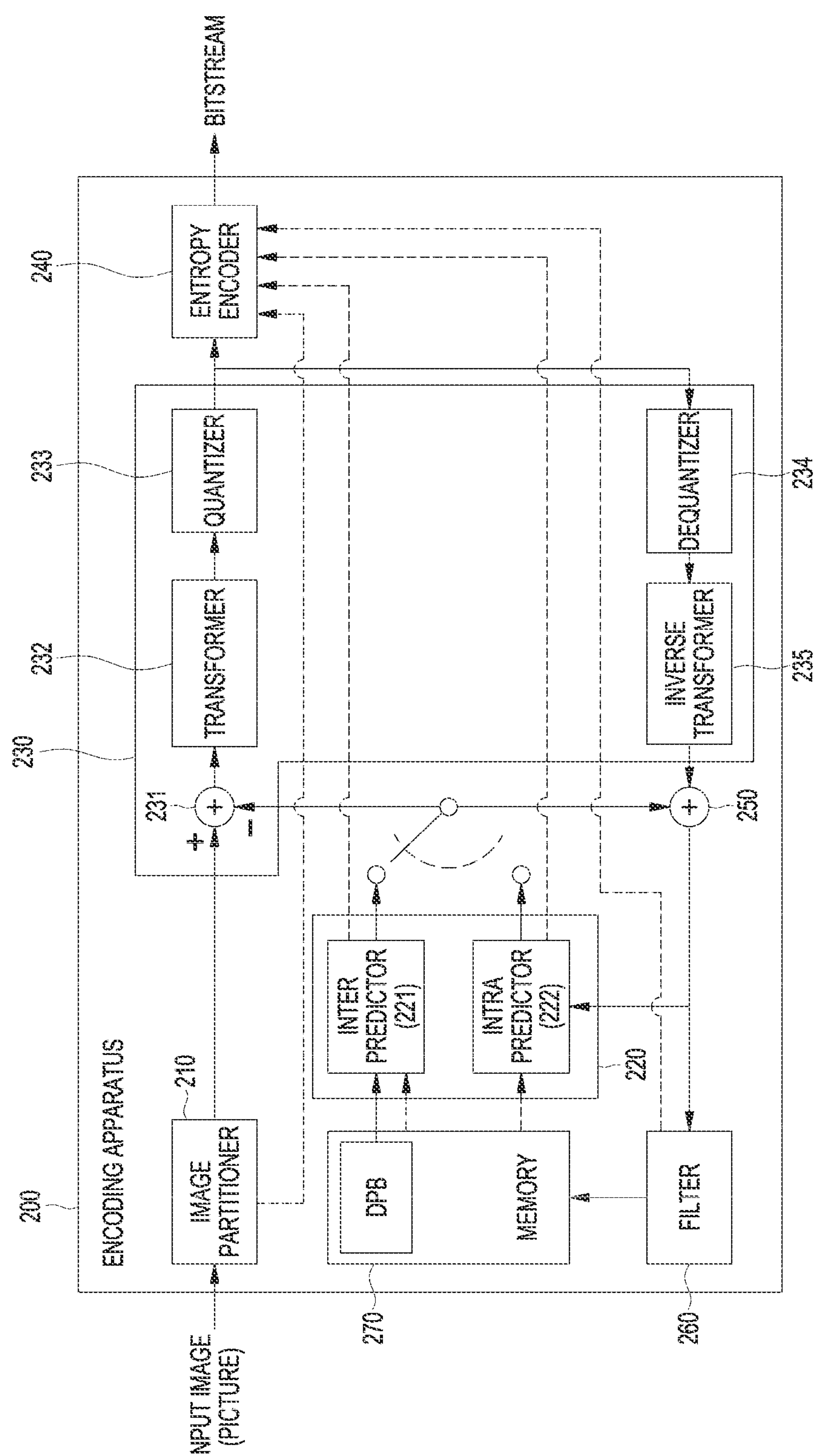
FIG. 2 is a diagram schematically explaining a configuration of a video/image encoding apparatus to which the present document may be applied.

FIG. 2 is a diagram schematically explaining a configuration of a video/image encoding apparatus to which the present document may be applied. Hereinafter, the video encoding apparatus may include an image encoding apparatus.

Referring to FIG. 2, the encoding apparatus 200 includes an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a predictor (PU) or a transformer (TU). In this case, the predictor and the transformer may be split or partitioned from the aforementioned final coding unit. The predictor may be a unit of sample prediction, and the transformer may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the subtractor 231, a prediction signal (predicted block, prediction samples or prediction sample array) output from the inter predictor 221 or the intra predictor 222 is subtracted from an input image signal (original block, original samples or original sample array) to generate a residual signal (residual block, residual samples or residual sample array), and the generated residual signal is transmitted to the transformer 232. The predictor 220 may perform prediction on a block to be processed (hereinafter, referred to as a current block) and generate a predicted block including prediction samples for the current block. The predictor 220 may determine whether intra prediction or inter prediction is applied on a current block or CU basis. As described later in the description of each prediction mode, the predictor may generate various information related to prediction, such as prediction mode information, and transmit the generated information to the entropy encoder 240. The information about the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information representing which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be represented by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present document. The palette mode may be considered as an example of intra coding or intra prediction. When the palette mode is applied, a sample value within a picture may be signaled based on information about the palette table and the palette index.

The prediction signal generated through the inter predictor 221 and/or the intra predictor 222 may be used to generate a reconstructed signal or may be used to generate a residual signal. The transformer 232 may generate transform coefficients by applying a transform technique to the residual signal. For example, the transform technique may include at least one of a Discrete Cosine Transform (DCT), a Discrete Sine Transform (DST), a Karhunen-Loeve Transform (KLT), a Graph-Based Transform (GBT), or a Conditionally Non-linear Transform (CNT). Here, the GBT means a transform obtained from a graph when the relationship information between pixels is graphically represented. The CNT means a transform obtained by generating the prediction signal by using all previously reconstructed pixels and based on the prediction signal. In addition, the transform process may also be applied to pixel blocks having the same size of a square, or may also be applied to blocks of variable sizes other than the square.

The quantizer 233 may quantize the transform coefficients and transmit them to the entropy encoder 240 and the entropy encoder 240 may encode the quantized signal (information about the quantized transform coefficients) and output a bitstream. The information about the quantized transform coefficients may be referred to as residual information. The quantizer 233 may rearrange block type quantized transform coefficients into a one-dimensional vector form based on a coefficient scanning order and generate information about the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information about various parameter sets such as an adaptation parameter set (APS), a picture parameter set (PPS), a sequence parameter set (SPS), or a video parameter set (VPS). In addition, the video/image information may further include general constraint information. In the present document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not illustrated) transmitting a signal output from the entropy encoder 240 and/or a storage unit (not illustrated) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
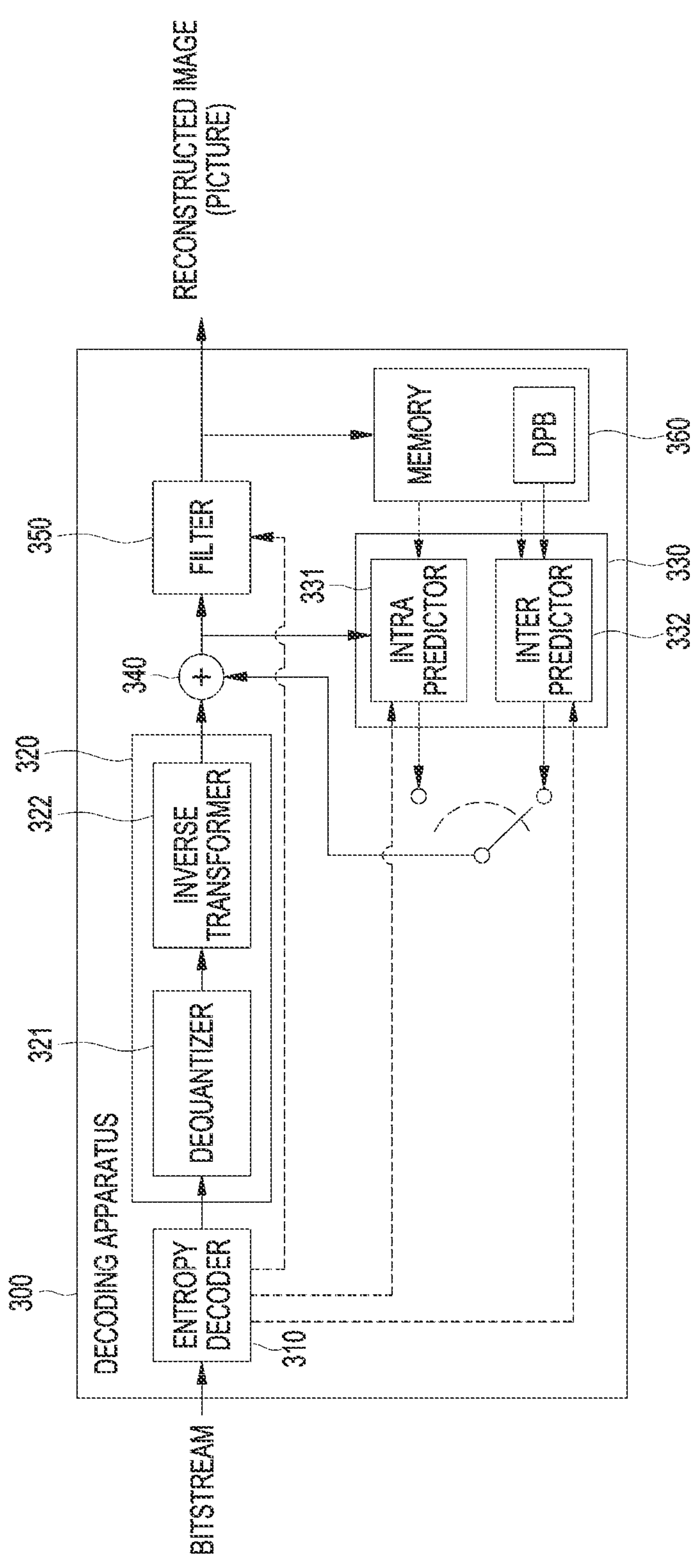
FIG. 3 is a diagram schematically explaining a configuration of a video/image decoding apparatus to which the present document may be applied.

FIG. 3 is a diagram schematically explaining a configuration of a video/image decoding apparatus to which the present document may be applied.

Referring to FIG. 3, the decoding apparatus 300 may include an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transformers may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information about various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information about the parameter set and/or the general constraint information. Signaled/received information and/or syntax elements described later in the present document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor 330, and the residual value on which the entropy decoding was performed in the entropy decoder 310, that is, the quantized transform coefficients and related parameter information, may be input to the dequantizer 321. In addition, information about filtering among information decoded by the entropy decoder 310 may be provided to the filter 350. Meanwhile, a receiver (not illustrated) for receiving a signal output from the encoding apparatus may be further configured as an internal/external element of the decoding apparatus 300, or the receiver may be a component of the entropy decoder 310. Meanwhile, the decoding apparatus according to the present document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the predictor 330, the adder 340, the filter 350 and the memory 360.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information about the prediction output from the entropy decoder 310 and may determine a specific intra/inter prediction mode.

The predictor may generate a prediction signal based on various prediction methods described below. For example, the predictor may not only apply intra prediction or inter prediction to predict one block but also simultaneously apply intra prediction and inter prediction. This may be called combined inter and intra prediction (CHIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present document.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information about the prediction may include information representing a mode of inter prediction on the current block.

The adder 340 may generate a reconstructed signal (reconstructed picture, reconstructed block, reconstructed sample array) by adding the obtained residual signal to the prediction signal (predicted block, prediction samples array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 332 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present document, the embodiments described in the predictor 330, the dequantizer 321, the inverse transformer 322, the filter 350 and the like of the decoding apparatus 300 may be the same as or respectively applied to correspond to the predictor 220, the dequantizer 234, the inverse transformer 235, the filter 350 and the like of the encoding apparatus 200.

As described above, in performing video coding, prediction is performed to increase compression efficiency. Therefore, a predicted block including the prediction samples for the current block which is a coding target block may be generated. Here, the predicted block includes the prediction samples in a spatial domain (or pixel domain). The predicted block is derived identically in the encoding apparatus and the decoding apparatus, and the encoding apparatus may signal information about the residual (residual information) between the original block and the predicted block, rather than the original sample value itself of the original block, to the decoding apparatus, thereby increasing image coding efficiency. The decoding apparatus may derive a residual block including residual samples based on the residual information, generate a reconstructed block including reconstructed samples by summing the residual block and the predicted block, and generate a reconstructed picture including the reconstructed blocks.

The residual information may be generated through transform and quantization procedures. For example, the encoding apparatus may signal related residual information (through a bitstream) to the decoding apparatus by deriving the residual block between the original block and the predicted block, deriving transform coefficients by performing the transform procedure for the residual samples (residual sample array) included in the residual block, and deriving quantized transform coefficients by performing the quantization procedure for the transform coefficients. Here, the residual information may include information such as value information, position information, transform technique, transform kernel, and quantization parameter of the quantized transform coefficients. The decoding apparatus may perform dequantization/inverse transform procedures based on the residual information and derive the residual samples (or residual blocks). The decoding apparatus may generate a reconstructed picture based on the predicted block and the residual block. The encoding apparatus may also dequantize/inversely transform the quantized transform coefficients for reference for the inter prediction of the post-picture to derive the residual block, and generate the reconstructed picture based thereon.

In the present document, at least one of quantization/dequantization and/or transform/inverse transform may be omitted. When the quantization/dequantization is omitted, the quantized transform coefficient may be referred to as a transform coefficient. When the transform/inverse transform is omitted, the transform coefficients may be called coefficients or residual coefficients, or may still be called transform coefficients for uniformity of expression. Further, whether the transformation/inverse transformation is omitted may be signaled on the basis of transform_skip_flag.

In the present document, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or information on the transform coefficient(s)), and scaled transform coefficients may be derived through inverse transform (scaling) on the transform coefficients. Residual samples may be derived based on an inverse transform (transform) of the scaled transform coefficients. This may be applied/expressed in other parts of the present document as well.

The prediction unit of the encoding apparatus/decoding apparatus may derive the prediction sample by performing the inter prediction in units of the block. Inter prediction can be a prediction derived in a manner that is de-pendent on data elements (e.g., sample values or motion information) of picture(s) other than the current picture. When the inter prediction is applied to the current block, a predicted block (prediction sample array) for the current block may be derived based on a reference block (reference sample array) specified by the motion vector on the reference picture indicated by the reference picture index. In this case, in order to reduce an amount of motion information transmitted in the inter-prediction mode, the motion information of the current block may be predicted in units of a block, a subblock, or a sample based on a correlation of the motion information between the neighboring block and the current block. The motion information may include the motion vector and the reference picture index. The motion information may further include inter-prediction type (L0 prediction, L1 prediction, Bi prediction, etc.) information. In the case of applying the inter prediction, the neighboring block may include a spatial neighboring block which is present in the current picture and a temporal neighboring block which is present in the reference picture. A reference picture including the reference block and a reference picture including the temporal neighboring block may be the same as each other or different from each other. The temporal neighboring block may be referred to as a name such as a collocated reference block, a collocated CU (colCU), etc., and the reference picture including the temporal neighboring block may be referred to as a collocated picture (colPic). For example, a motion information candidate list may be configured based on the neighboring blocks of the current block and a flag or index information indicating which candidate is selected (used) may be signaled in order to derive the motion vector and/or reference picture index of the current block. The inter prediction may be performed based on various prediction modes and for example, in the case of a skip mode and a merge mode, the motion information of the current block may be the same as the motion information of the selected neighboring block. In the case of the skip mode, the residual signal may not be transmitted unlike the merge mode. In the case of a motion vector prediction (MVP) mode, the motion vector of the selected neighboring block may be used as a motion vector predictor and a motion vector difference may be signaled. In this case, the motion vector of the current block may be derived by using a sum of the motion vector predictor and the motion vector difference.

The motion information may include L0 motion information and/or L1 motion information according to an inter prediction type (L0 prediction, L1 prediction, Bi prediction, etc.). The motion vector in the L0 direction may be referred to as an L0 motion vector or MVL0, and the motion vector in the L1 direction may be referred to as an L1 motion vector or MVL1. Prediction based on the L0 motion vector may be called L0 prediction, prediction based on the L1 motion vector may be called L1 prediction, and prediction based on both the L0 motion vector and the L1 motion vector may be called bi-prediction. Here, the L0 motion vector may indicate a motion vector associated with the reference picture list L0 (L0), and the L1 motion vector may indicate a motion vector associated with the reference picture list L1 (L1). The reference picture list L0 may include pictures that are earlier in output order than the current picture as reference pictures, and the reference picture list L1 may include pictures that are later in the output order than the current picture. The previous pictures may be called forward (reference) pictures, and the subsequent pictures may be called reverse (reference) pictures. The reference picture list L0 may further include pictures that are later in the output order than the current picture as reference pictures. In this case, the previous pictures may be indexed first in the reference picture list L0 and the subsequent pictures may be indexed later. The reference picture list L1 may further include previous pictures in the output order than the current picture as reference pictures. In this case, the subsequent pictures may be indexed first in the reference picture list 1 and the previous pictures may be indexed later. The output order may correspond to picture order count (POC) order.

Figure 4:
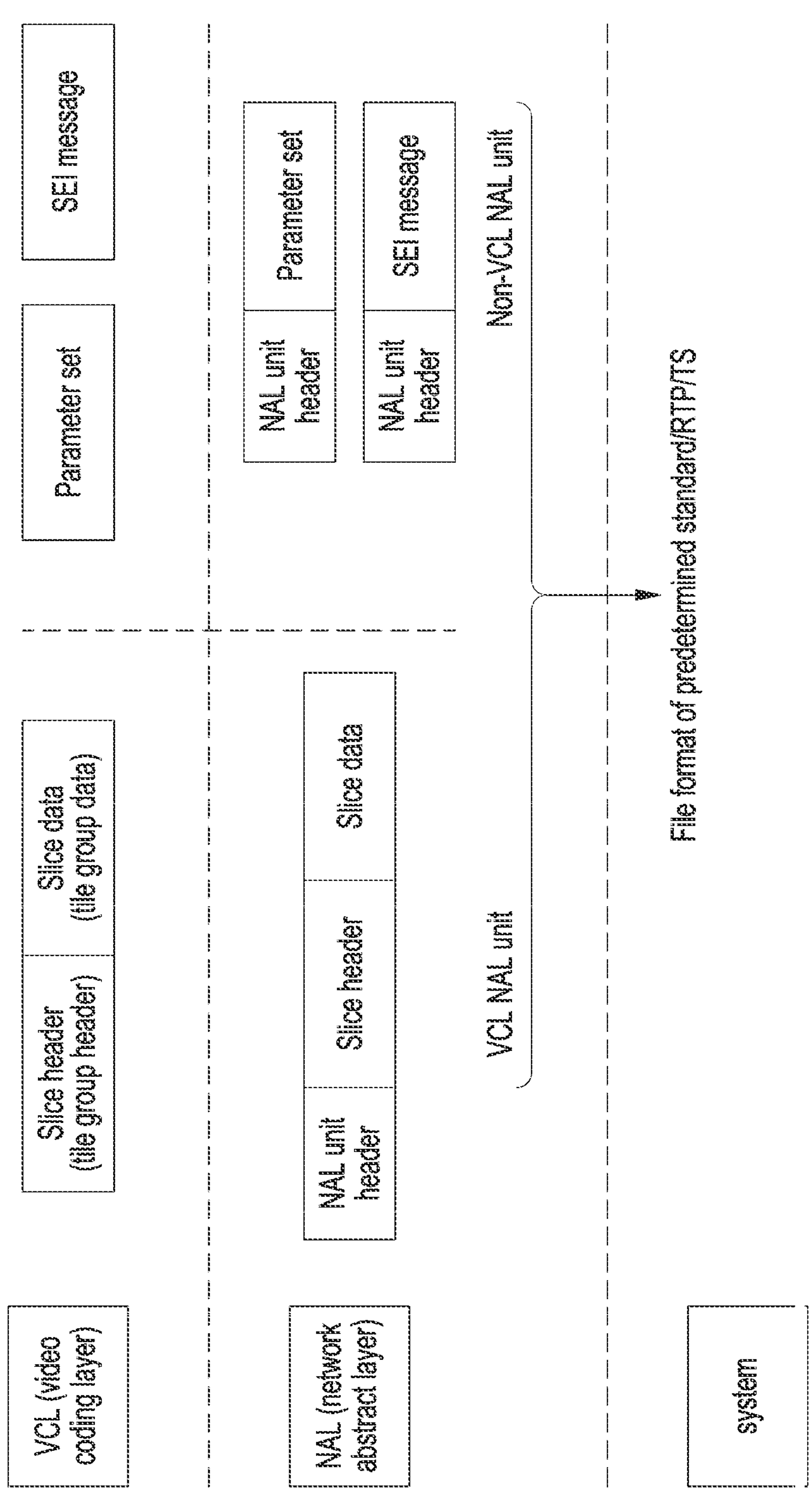
FIG. 4 exemplarily shows a hierarchical structure for a coded image/video.

FIG. 4 exemplarily shows a hierarchical structure for a coded image/video.

Referring to FIG. 4, coded image/video is divided into a video coding layer (VCL) that handles the decoding process of the image/video and itself, a subsystem that transmits and stores the coded information, and NAL (network abstraction layer) in charge of function and present between the VCL and the subsystem.

In the VCL, VCL data including compressed image data (slice data) is generated, or a parameter set including a picture parameter set (PSP), a sequence parameter set (SPS), and a video parameter set (VPS) or a supplemental enhancement information (SEI) message additionally required for an image decoding process may be generated.

In the NAL, a NAL unit may be generated by adding header information (NAL unit header) to a raw byte sequence payload (RBSP) generated in a VCL. In this case, the RBSP refers to slice data, parameter set, SEI message, etc., generated in the VCL. The NAL unit header may include NAL unit type information specified according to RBSP data included in the corresponding NAL unit.

As shown in the figure, the NAL unit may be classified into a VCL NAL unit and a Non-VCL NAL unit according to the RBSP generated in the VCL. The VCL NAL unit may mean a NAL unit that includes information on the image (slice data) on the image, and the Non-VCL NAL unit may mean a NAL unit that includes information (parameter set or SEI message) required for decoding the image.

The above-described VCL NAL unit and Non-VCL NAL unit may be transmitted through a network by attaching header information according to the data standard of the subsystem. For example, the NAL unit may be transformed into a data format of a predetermined standard such as an H.266/VVC file format, a real-time transport protocol (RTP), a transport stream (TS), etc., and transmitted through various networks.

As described above, the NAL unit may be specified with the NAL unit type according to the RBSP data structure included in the corresponding NAL unit, and information on the NAL unit type may be stored and signaled in the NAL unit header.

For example, the NAL unit may be classified into a VCL NAL unit type and a Non-VCL NAL unit type according to whether the NAL unit includes information (slice data) about an image. The VCL NAL unit type may be classified according to the nature and type of pictures included in the VCL NAL unit, and the Non-VCL NAL unit type may be classified according to types of parameter sets.

The following is an example of the NAL unit type specified according to the type of parameter set included in the Non-VCL NAL unit type.

APS (Adaptation Parameter Set) NAL unit: Type for NAL unit including APS

DPS (Decoding Parameter Set) NAL unit: Type for NAL unit including DPS

VPS (Video Parameter Set) NAL unit: Type for NAL unit including VPS

SPS (Sequence Parameter Set) NAL unit: Type for NAL unit including SPS

PPS (Picture Parameter Set) NAL unit: Type for NAL unit including PPS

PH (Picture header) NAL unit: Type for NAL unit including PH

The aforementioned NAL unit types may have syntax information for the NAL unit type, and the syntax information may be stored and signaled in a NAL unit header. For example, the syntax information may be nal_unit_type, and NAL unit types may be specified by a nal_unit_type value.

Meanwhile, as described above, one picture may include a plurality of slices, and one slice may include a slice header and slice data. In this case, one picture header may be further added to a plurality of slices (a slice header and a slice data set) in one picture. The picture header (picture header syntax) may include information/parameters commonly applicable to the picture. In the present document, a slice may be mixed or replaced with a tile group. Also, in the present document, a slice header may be mixed or replaced with a tile group header.

The slice header (slice header syntax, slice header information) may include information/parameters that may be commonly applied to the slice. The APS (APS syntax) or the PPS (PPS syntax) may include information/parameters that may be commonly applied to one or more slices or pictures. The SPS (SPS syntax) may include information/parameters that may be commonly applied to one or more sequences. The VPS (VPS syntax) may include information/parameters that may be commonly applied to multiple layers. The DCI (DCI syntax) may include information/parameters that may be commonly applied to the overall video. The DCI may include information/parameters related to a decoding capability. The high level syntax (HLS) in the present document may include at least one of the APS syntax, the PPS syntax, the SPS syntax, the VPS syntax, the DCI syntax, picture header syntax and the slice header syntax.

In the present document, the image/image information encoded from the encoding apparatus and signaled to the decoding apparatus in the form of a bitstream includes not only partitioning related information in a picture, intra/inter prediction information, residual information, in-loop filtering information, etc, but also information included in a slice header, information included in the APS, information included in the PPS, information included in an SPS, information included in the VPS and/or information included in the DCI. Further, the image/image information may further include information on NAL unit header.

Meanwhile, as described above, when performing prediction on the current block, intra prediction or inter prediction can be applied. Hereinafter, the case of applying inter prediction to the current block will be described.

When inter prediction is applied, the predictor of the encoding apparatus/decoding apparatus may derive a prediction sample by performing inter prediction in units of blocks. Inter prediction may be a prediction derived in a manner that is dependent on data elements (ex. sample values or motion information) of picture(s) other than the current picture. When inter prediction is applied to the current block, a predicted block (prediction sample array) for the current block may be derived based on a reference block (reference sample array) specified by a motion vector on the reference picture indicated by the reference picture index. Here, in order to reduce the amount of motion information transmitted in the inter prediction mode, the motion information of the current block may be predicted in units of blocks, subblocks, or samples based on correlation of motion information between the neighboring block and the current block. The motion information may include a motion vector and a reference picture index. The motion information may further include inter prediction type (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, a motion information candidate list may be configured based on neighboring blocks of the current block, and flag or index information indicating which candidate is selected (used) may be signaled to derive a motion vector and/or a reference picture index of the current block. Inter prediction may be performed based on various prediction modes. For example, in the case of a skip mode and a merge mode, the motion information of the current block may be the same as motion information of the neighboring block. In the skip mode, unlike the merge mode, the residual signal may not be transmitted. In the case of the motion vector prediction (MVP) mode, the motion vector of the selected neighboring block may be used as a motion vector predictor and the motion vector of the current block may be signaled. In this case, the motion vector of the current block may be derived using the sum of the motion vector predictor and the motion vector difference.

The motion information may include L0 motion information and/or L1 motion information according to an inter prediction type (L0 prediction, L1 prediction, Bi prediction, etc.). The motion vector in the L0 direction may be referred to as an L0 motion vector or MVL0, and the motion vector in the L1 direction may be referred to as an L1 motion vector or MVL1. Prediction based on the L0 motion vector may be called L0 prediction, prediction based on the L1 motion vector may be called L1 prediction, and prediction based on both the L0 motion vector and the L1 motion vector may be called bi-prediction. Here, the L0 motion vector may indicate a motion vector associated with the reference picture list L0 (L0), and the L1 motion vector may indicate a motion vector associated with the reference picture list L1 (L1). The reference picture list L0 may include pictures that are earlier in output order than the current picture as reference pictures, and the reference picture list L1 may include pictures that are later in the output order than the current picture. The previous pictures may be called forward (reference) pictures, and the subsequent pictures may be called reverse (reference) pictures. The reference picture list L0 may further include pictures that are later in the output order than the current picture as reference pictures. In this case, the previous pictures may be indexed first in the reference picture list L0 and the subsequent pictures may be indexed later. The reference picture list L1 may further include previous pictures in the output order than the current picture as reference pictures. In this case, the subsequent pictures may be indexed first in the reference picture list 1 and the previous pictures may be indexed later. The output order may correspond to picture order count (POC) order.

Figure 5:
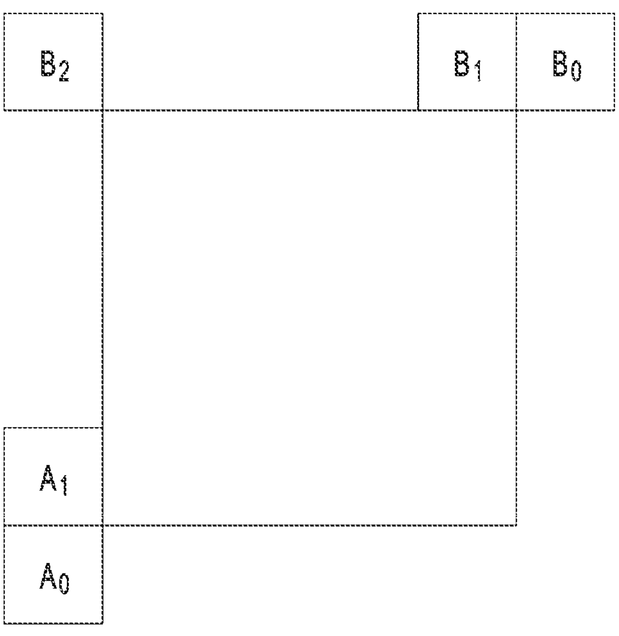
FIG. 5 is a diagram illustrating a method of deriving motion information in an inter prediction mode.

FIG. 5 is a diagram explaining a method for deriving motion information through an inter prediction mode. Here, the inter prediction mode may include a merge mode, a motion vector prediction (MVP) mode (or advanced motion vector prediction (AMVP)), a pair-wise average merge mode and history-based MVP (HMVP) mode.

When the merge mode is applied, the motion information of the current prediction block is not directly transmitted, and the motion information of the current prediction block is derived by using the motion information of a neighboring prediction block. Accordingly, flag information indicating that the merge mode is used and a merge index indicating which neighboring prediction block is used are transmitted to indicate the motion information of the current prediction block.

The encoder may search a merge candidate block used for deriving the motion information of the current prediction block in order to perform the merge mode. For example, up to five merge candidate blocks may be used, but the present disclosure is not limited thereto. In addition, the maximum number of merge candidate blocks may be transmitted in a slider header (or tile group header) and the present disclosure is not limited thereto. After finding the merge candidate blocks, the encoder may generate the merging candidate list and selects a merge candidate block having the smallest cost among the merge candidate blocks as a final merge candidate block.

The merge candidate list may use 5 merge candidate blocks, for example. For example, 4 spatial merge candidates and 1 temporal merge candidate may be used. For detailed example, in the case of a spatial merge candidate, blocks illustrated in FIG. 5 may be used as spatial merge candidates.

The merge candidate list for the current block may be constructed based on the following process, for example.

A coding apparatus (encoder/decoder) may insert, into a merge candidate list, spatial merge candidates derived by searching for spatial neighboring blocks of a current block. For example, the spatial neighboring blocks may include a bottom-left corner neighboring block, a left neighboring block, a top-right corner neighboring block, a top neighboring block, and a top-left corner neighboring block of the current block. However, this is an example and, in addition to the above-described spatial neighboring blocks, additional neighboring blocks such as a right neighboring block, a bottom neighboring block and a bottom-right neighboring block may be further used as the spatial neighboring blocks. The coding apparatus may detect available blocks by searching for the spatial neighboring blocks based on priority and derive motion information of the detected blocks as the spatial merge candidates. For example, the encoder/decoder may construct a merge candidate list by searching for the five blocks in order of A1, B1, B0, A0 and B2 and sequentially indexing available candidates.

The coding apparatus may insert, into the merge candidate list, a temporal merge candidate derived by searching for temporal neighboring blocks of the current block. The temporal neighboring blocks may be located on a reference picture which is different from a current picture in which the current block is located. A reference picture in which the temporal neighboring block is located may be referred to as a collocated picture or a col picture. The temporal neighboring block may be searched for in order of a bottom-right corner neighboring block and a bottom-right center block of the co-located block for the current block on the col picture. Meanwhile, when applying motion data compression in order to reduce memory load, specific motion information may be stored as representative motion information for each predetermined storage unit for the col picture. In this case, motion information of all blocks in the predetermined storage unit does not need to be stored, thereby obtaining motion data compression effect. In this case, the predetermined storage unit may be predetermined as, for example, 16×16 sample unit or 8×8 sample unit or size information of the predetermined storage unit may be signaled from the image encoding apparatus to the image decoding apparatus. When applying the motion data compression, the motion information of the temporal neighboring block may be replaced with the representative motion information of the predetermined storage unit in which the temporal neighboring block is located. That is, in this case, from the viewpoint of implementation, the temporal merge candidate may be derived based on the motion information of a prediction block covering an arithmetic left-shifted position after an arithmetic right shift by a predetermined value based on coordinates (top-left sample position) of the temporal neighboring block, not a prediction block located on the coordinates of the temporal neighboring block. For example, when the predetermined storage unit is a 2n×2n sample unit and the coordinates of the temporal neighboring block are (xTnb, yTnb), the motion information of a prediction block located at a modified position (xTab>>n)<<n), (yTnb>>n)<<n)) may be used for the temporal merge candidate. Specifically, for example, when the predetermined storage unit is a 16×16 sample unit and the coordinates of the temporal neighboring block are (xTnb, yTnb), the motion information of a prediction block located at a modified position (xTnb>>4)<<4), (yTnb>4)<<4)) may be used for the temporal merge candidate. Alternatively, for example, when the predetermined storage unit is an 8×8 sample unit and the coordinates of the temporal neighboring block are (xTnb, yTnb), the motion information of a prediction block located at a modified position (xTnb>>3)<<3), (yTnb>>3)<<3)) may be used for the temporal merge candidate.

The coding apparatus may check whether the current number of merge candidates is less than a maximum number of merge candidates (a maximum number of candidates included in the merge candidate list). The maximum number of merge candidates may be predefined or signaled from the encoder to the decoder (e.g., through the tile group header or SPS). For example, the encoder may generate and encode information on the maximum number of merge candidates (a maximum number of candidates included in the merge candidate list) and transmit the encoded information to the decoder in the form of a bitstream. When the maximum number of merge candidates is satisfied, a subsequent candidate addition process may not be performed.

When the current number of merge candidates is less than the maximum number of merge candidates as a checked result, the coding apparatus may derive an additional merge candidate according to a predetermined method and then insert the additional merge candidate to the merge candidate list. The additional merge candidate may include, for example, at least one of history-based merge candidate(s), pair-wise average merge candidate(s), ATMVP, combined bi-predictive merge candidate(s) (when a slice/tile group type of a current slice/tile group is a B type) and/or zero vector merge candidate(s).

When the current number of merge candidates is not less than the maximum number of merge candidates as a checked result, the coding apparatus may end the construction of the merge candidate list. In this case, the encoder may select an optimal merge candidate from among the merge candidates configuring the merge candidate list based on rate-distortion (RD) cost, and signal candidate selection information (e.g., merge index) indicating the selected merge candidate to the decoder. The decoder may select the optimal merge candidate based on the merge candidate list and the candidate selection information.

The motion information of the selected merge candidate may be used as the motion information of the current block, and the prediction samples of the current block may be derived based on the motion information of the current block, as described above. The encoder may derive the residual samples of the current block based on the prediction samples and signal residual information of the residual samples to the decoder. The decoder may generate reconstructed samples based on the residual samples derived based on the residual information and the prediction samples and generate the reconstructed picture based on the same, as described above.

When applying a skip mode to the current block, the motion information of the current block may be derived using the same method as the case of applying the merge mode. However, when applying the skip mode, a residual signal for a corresponding block is omitted and thus the prediction samples may be directly used as the reconstructed samples.

If a motion vector prediction (MVP) mode is applied, a motion vector predictor (mvp) candidate list may be generated based on a motion vector of a reconstructed spatial neighboring block (e.g., the neighboring block described in FIG. 4) and/or a motion vector corresponding to a temporal neighboring block (or Col block). That is, the motion vector of the reconstructed spatial neighboring block and/or the motion vector of the temporal neighboring block may be used as a motion vector predictor candidate. When applying bi-prediction, an mvp candidate list for L0 motion information derivation and an mvp candidate list for L1 motion information derivation are individually generated and used. Prediction information (or information on prediction) of the current block may include candidate selection information (e.g., an MVP flag or an MVP index) indicating an optimal motion vector predictor candidate selected from among the motion vector predictor candidates included in the mvp candidate list. In this case, a prediction unit may select a motion vector predictor of a current block from among the motion vector predictor candidates included in the mvp candidate list using the candidate selection information. The prediction unit of the image encoding apparatus may obtain and encode a motion vector difference (MVD) between the motion vector of the current block and the motion vector predictor and output the encoded MVD in the form of a bitstream. That is, the MVD may be obtained by subtracting the motion vector predictor from the motion vector of the current block. The prediction unit of the image decoding apparatus may obtain a motion vector difference included in the information on prediction and derive the motion vector of the current block through addition of the motion vector difference and the motion vector predictor. The prediction unit of the decoding apparatus may obtain or derive a reference picture index indicating a reference picture from the information on prediction.

In the derivation process of a history-based MVP (HMVP) merge candidate, the HMVP merge candidate may be added to a merge list after the spatial MVP and the TMVP are inserted. Here, the motion information of the previously coded block is stored in a table and used as the MVP for the current CU. A table constituted by multiple HVMP candidates is maintained during the encoding/decoding process. When a new CTU row is used, the table is reset (e.g., empty). When there is a CU coded by the inter prediction other than the subblock, related motion information is added to a last entry of the table as a new HMVP candidate.

An HVMP table size S is set to 6, and this means that up to 6 HVMP candidates may be added to the table. When a new motion candidate is inserted into the table, a constrained first-in-first-out (FIFO) rule is used. Here, redundancy checking for checking whether the same HVMP candidate as the HVMP candidate to be added exists in the table is first performed. When the same HVMP candidate exists, the existing same MVVP candidate is removed from the table and all HMVP candidates move to a previous order.

The HMVP candidates may be used in a merge candidate list construction process. In the table, most recent HVMP candidates are checked and inserted into the merge candidate list in a subsequent order of the TMVP candidate. Checking the redundancy for the HMVP candidate is applied to the spatial or temporal merge candidate.

In the derivation process of pair-wise average candidates, the pair-wise average candidates may be generated by averaging predefined candidate pairs from the candidates included in the merge candidate list. The predefined candidate pairs may be defined as {(0, 1), (0, 2), (1, 2), (0, 3), (1, 3), (2, 3)}. Here, the number may be indicated a merge index of the merge candidate list. Averaged motion vectors are calculated separately for each reference list. When two motion vectors are available in one list, the two motion vectors may be averaged even when they indicate different reference pictures. When only one motion vector is available, the motion vector may be directly used. When no motion vector is available, the list may not be considered invalid.

Hereinafter, Adaptive ordering of merge candidates with template matching (ARMC-TM) will be described.

For example, merge candidates can be adaptively rearranged using a template matching (TM). The reordering method can be applied to a regular merge mode, TM merge mode, and affine merge mode but not applied to SbTMVP candidates. For TM merge mode, the merge candidates can be rearranged before a refinement process.

After the merge candidate list is constructed, the merge candidates may be divided into several subgroups. The subgroup size is set to 5 for the regular merge mode and the TM merge mode, and the subgroup size is set to 3 for the affine merge mode. The merge candidates in each subgroup can be rearranged in ascending order (ascendingly) according to cost values based on the template matching. For simplification, the merge candidates in the last subgroup but not the first subgroup may not be reordered.

Regarding the template matching, the template matching cost of a merge candidate can be measured by the sum of absolute difference (SAD) between samples of a template of the current block and their corresponding reference samples. Here, the template may include a set of reconstructed samples neighboring the current block. The reference samples of the template may be located by the motion information of the merge candidate. In other words, the location of the reference samples of the template may be determined by motion information of the merge candidate.

Figure 6:
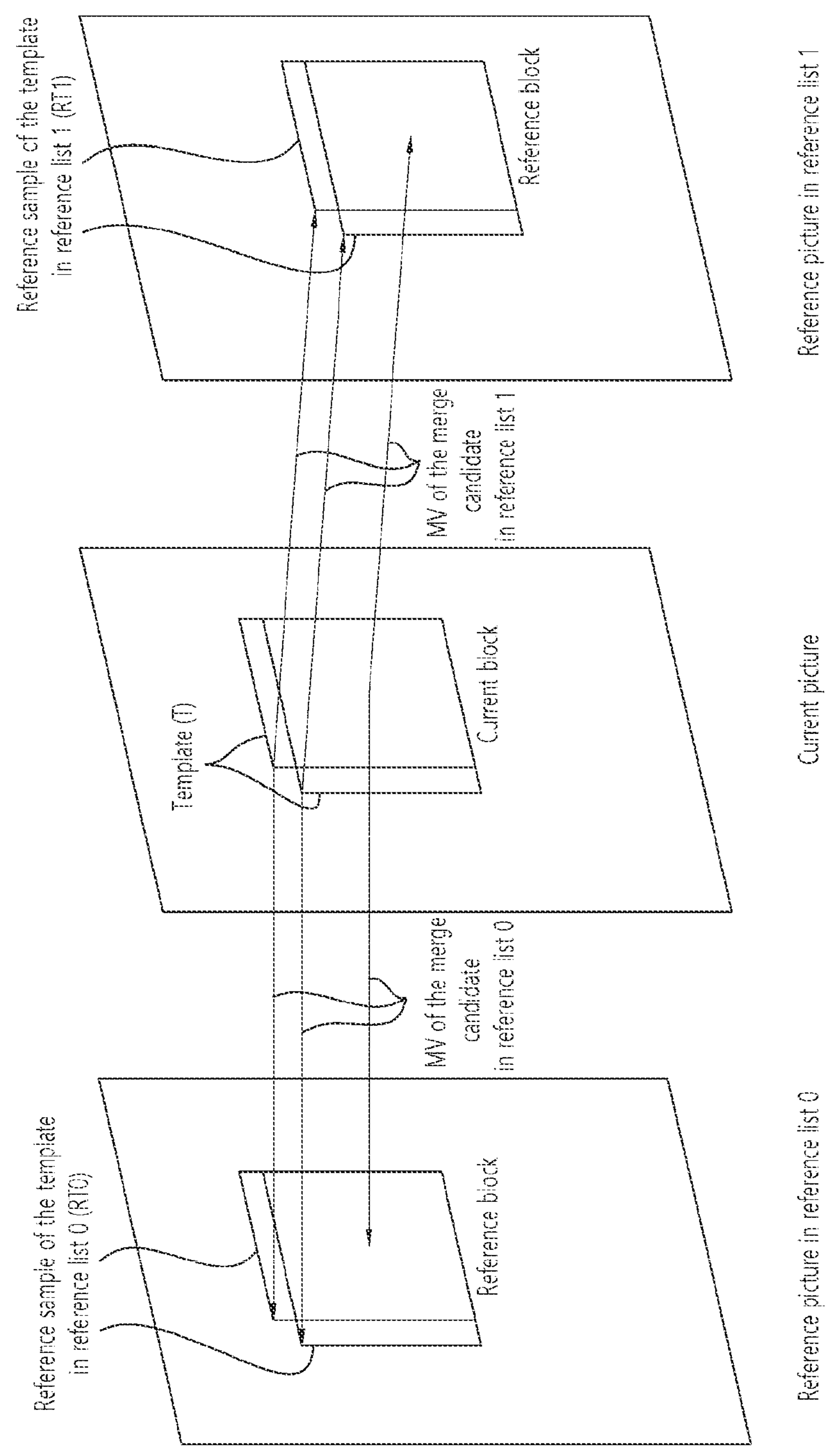
FIG. 6 is a diagram illustrating reference samples in a template of a current picture and a template of reference pictures.

FIG. 6 illustrates an example of a template of the current picture and reference samples of a template in the reference pictures.

Referring to FIG. 6, when the merge candidate is used to a bi-directional prediction, the reference samples of the template of the merge candidate is also generated by the bi-directional prediction. For example, positions of reference samples in a reference picture of reference list 0 may be determined by motion information of merge candidates of reference list 0, and positions of reference samples in a reference picture of reference list 1 may be determined by motion information of merge candidates of reference list 1.

Also, in the case of subblock-based merge candidates with a subblock size of $W_{sub} \times H_{sub}$, the above template may include several sub-templates with the size of $W_{sub} \times 1$ and the left template may include several sub-templates with the size of $1 \times H_{sub}$.

Figure 7:
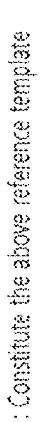
FIG. 7 is a diagram illustrating a motion information-based template of sub-blocks and reference samples of the template.
Figure 7:
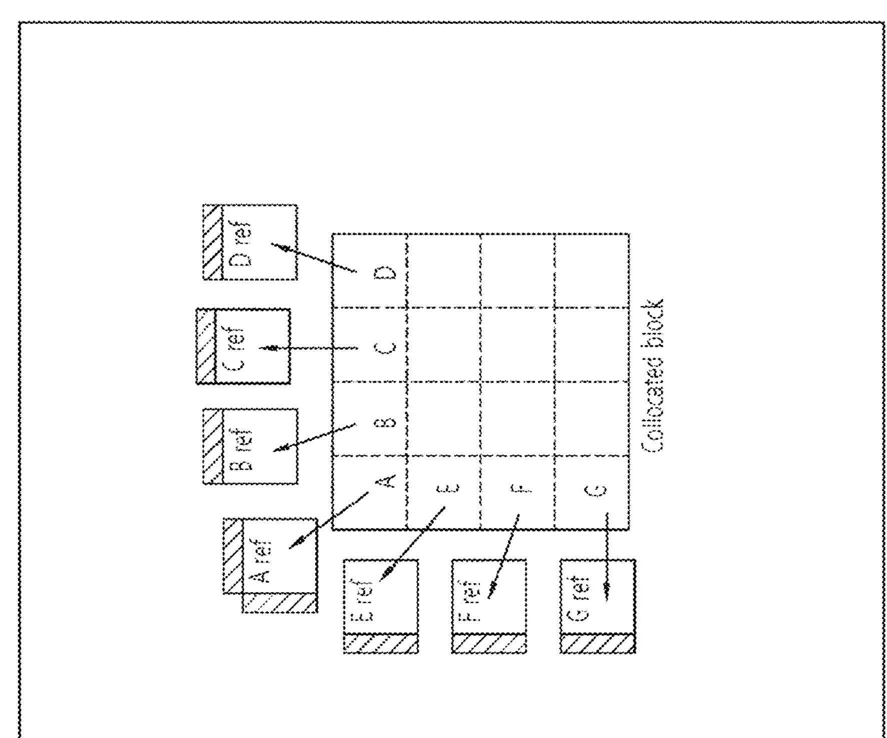
Figure 7:
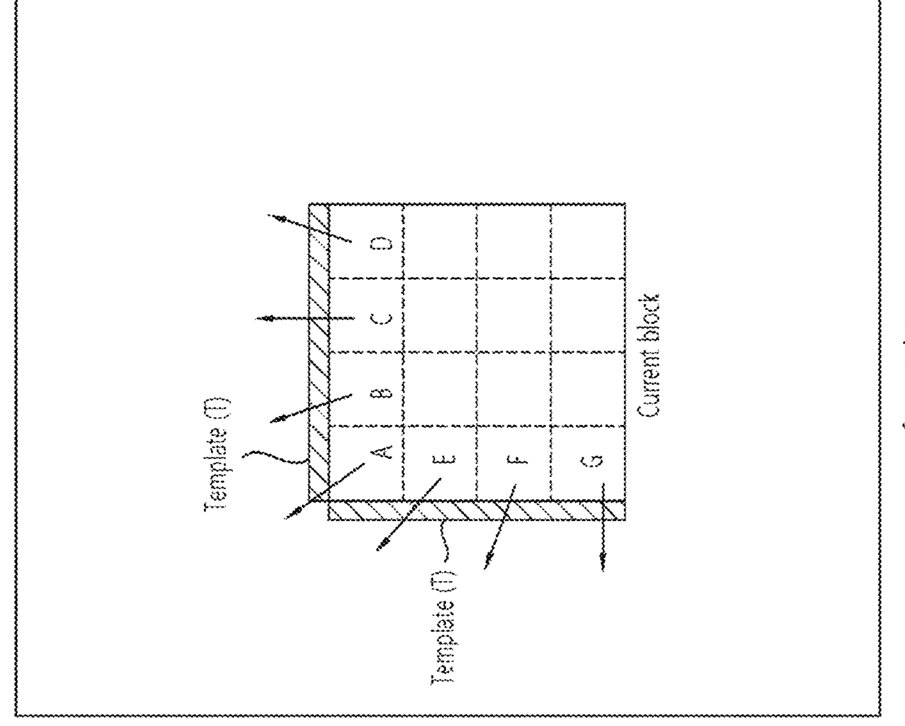

FIG. 7 illustrates an example of a motion information-based template and reference samples of a template.

Referring to FIG. 7, the motion information of the subblocks in the first row and first column of the current block may be used to derive the reference samples of each sub-template.

Meanwhile, for the regular merge candidate, a method of expanding the merge list to a maximum of 15 candidates may be proposed.

Figure 8:
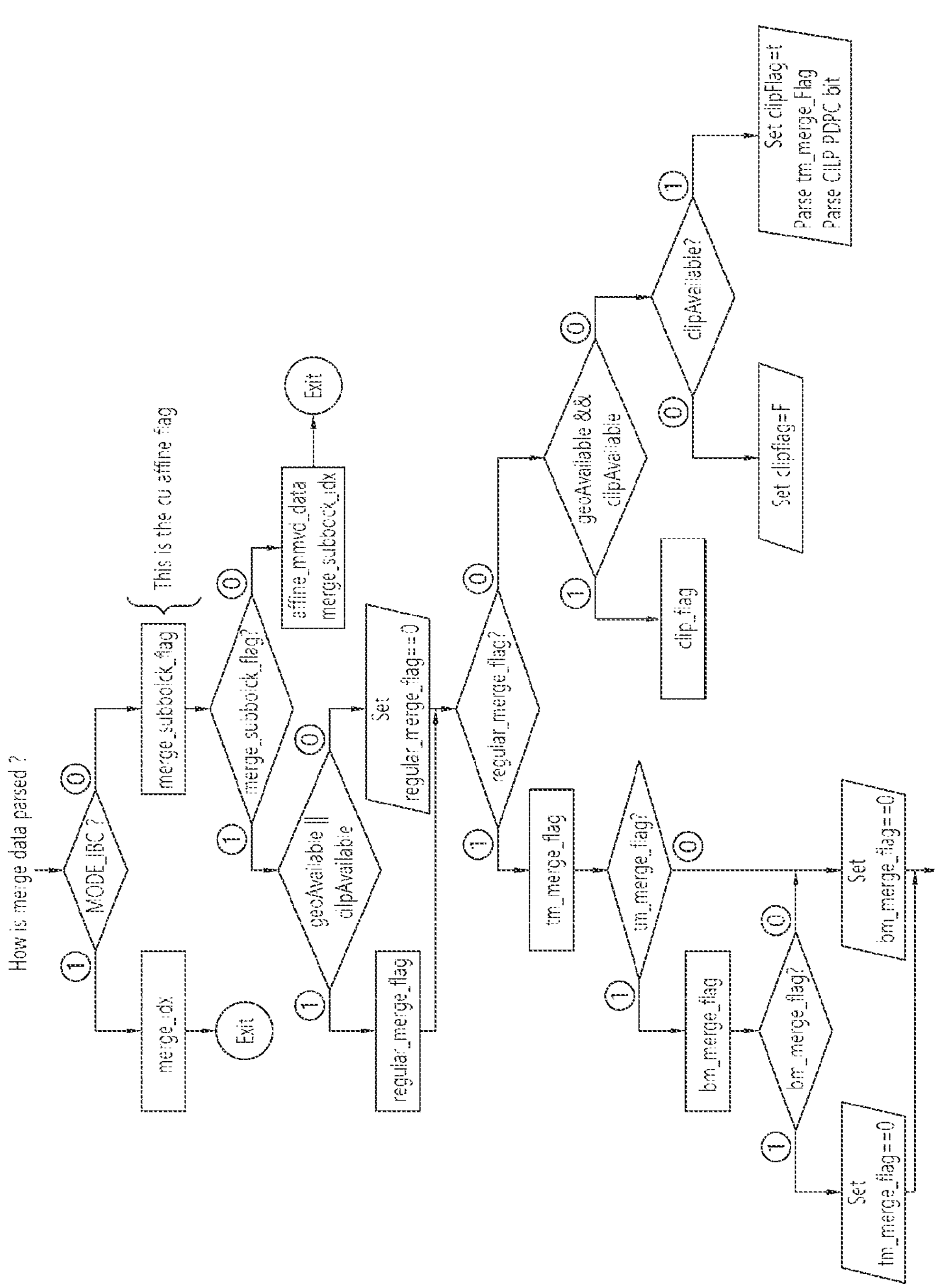
FIG. 8 is a flowchart illustrating a method of parsing merge data.

FIG. 8 illustrates an example of a method of parsing merge data.

For example, a case where a value of specific information is equal to 1 in the present document may represent that the specific information is available. Also, a case where the value of specific information is equal to 0 in the present document may represent that the specific information is unavailable.

For example, merge_idx information or merge_subblock_flag information may be parsed on the basis of MODE_IBC information. Here, when a value of the MODE_IBC information is equal to 1, the merge_idx information may be parsed, and when the value of the MODE_IBC information is equal to 0, the merge-subblock_flag information may be parsed.

Also, affine_mmvd_data information and merge_subblock_idx information may be parsed on the basis of the merge_subblock_flag information. Here, when a value of the merge_subblock_flag information is equal to 0, the affine_mmvd_data information and the merge_subblock_idx information may be parsed.

Also, when the value of the merge_subblock_flag information is equal to 1, regular_merge_flag information may be derived on the basis of geoAvailable information and ciipAvailable information may be parsed.

Also, tm_merge_flag information may be parsed on the basis of the regular_merge_flag information. Here, when a value of the regular_merge_flag information is equal to 1, the tm_merge_flag information may be parsed. In addition, when a value of the tm_merge_flag information is equal to 1, bm_merge_flag information may be parsed.

Also, when the value of the regular_merge_flag information is equal to 0, ciip_flag information may be parsed on the basis of the geoAvailable information and the ciipAvailable information. Here, when a value of the geoAvailable information and a value of the clipAvailable information both are equal to 1, the ciip_flag information may be parsed.

To improve performance of an inter coding structure, the present document proposes the following embodiments. The proposed embodiments may apply individually or in combination.

As an example, a secondary list may be used with potential candidates. Here, the secondary list may be applicable to the merge mode or AMVP mode as well. Also, within the context of merge mode, the secondary list may be applied to the regular merge mode, affine merge mode, or the like.

For example, when used in the merge mode, it may be considered as a secondary merge list (SML) to evaluate the inter prediction mode. In other words, an SML may be used with an existing merge list. In the present document, an SML may be called a second merge list. For example, an existing merge list may be called a primary merge list or a first merge list.

For example, The SML may be used for regular merge mode, affine mode and/or GPM merge mode.

Further, for example, the use of SML may be signaled in the SPS. For example, the flag information related to the use of SML may be signaled in the SPS. For example, a syntax element sps_secondary_merge_list may be parsed. When the flag information is equal to 0, it may be indicated that a SML cannot be used and when the flag information is equal to 1, it may be indicated that a SML is used for all the pictures referring to the SPS in the CLVS.

Also, for example, additional controls may be present to govern the operation of the SML during the decoding process. For example, a CTU/CU level switch may be present. For example, a flag present at the CTU may indicate whether the CUs within the CTU use a SML. Here, when the CTU level flag is true, additional detail information such as the number of candidates may also be parsed at the CU level.

Also, a PH/CU level switch may be present. For example, when the PH/CU level switch may be present, an initial flag indicating whether all CUs are the PH may have a SML. When the SML flag at the PH level is true, additional detail information may be parsed at the CU level.

Also, for example, the number of candidates to be used in the SML may be parsed or derived the following.

i. For example, the maximum number of candidates for the SML may be parsed in the SPS. Also, the maximum number of candidates for the SML may be parsed in the picture header, the slice header, the CTU, the CU etc.
ii. Alternatively, the number of candidates may be fixed.
iii. The SML may alternatively be parsed or derived by considering aspects of the blocks such as the block dimensions, availability of neighbors, mode of available neighbors, and availability of motion information and so on.

Also, for example, the number of merge candidates for the SML may be signaled. Here, the number of merge candidates for the SML may be signaled as a delta (or a difference) to the number of merge candidates.

i. For example, the number of candidates to be used, when being parsed in SPS, may be fixed length coded.
ii. For example, when the number of candidates is parsed in the CU/CTU/Slice and/or PH level, it may be possible to have a variable number of SML candidates.

Also, for example, when the SML is used, if the merge index corresponds to a candidate of the SML, the corresponding merge index may be coded as the difference merge index and the number of candidates in the primary merge list.

i. Additionally, the merge index may be coded using context adaptive coding, with the number of contexts to be used determined using block statistics and/or other means as described below. Here, the block statistics may be considered to include block dimensions, motion, available motion information, etc.

Also, for example, the SML may be used with the following type of candidates.

Regarding spatial candidates, the following may be considered.

i. For example, VVC considers a maximum of 6 spatial candidates for regular merge which is signaled in the SPS. Therefore, it may be possible to consider additional spatial candidates, in increasing order of CU distance, until the CTU boundaries are reached. Here, the increasing order of CU distance may be considered as an increasing order of concentric circles.
ii. For example, it may alternatively be possible to add all additional spatial candidates under consideration in a single direction following the spatial candidates in another direction. This may help improve the efficiency of the merge list generation as the available candidates in a single direction may be generated faster.

Also, regarding temporal candidates, VVC currently examines two temporal candidates. Here, additional temporal positions may also be evaluated for availability and use into the SML.

Also, regarding HMVP, a HMVP table may be extended, and additional candidates may be added after the spatial candidates.

Also, additional pairwise candidates may be generated as the candidates for the SML and added to the list.

Also, for example, it may be possible to re-order the spatial candidates in the SML using template matching cost.

i. Alternatively, it may be possible to consider other forms of cost computation, such as SAD, mean removed SAD (MR-SAD), etc.
ii. It may be possible to divide the SML into groups of candidates and re-order the candidates. For example, the SML list may be divided into 3 groups, and the candidates may be re-ordered according to the template matching cost. Also, it may be possible to consider other sizes to re-order.

iii. Alternately, it may be possible to re-order all the candidates in the SML.

For example, it may be possible to use a secondary list of candidates to supplement luma block vector prediction. In other word, when the general_merge_flag is equal to 0, that is, it may be possible to use a secondary list of candidates to supplement luma block vector prediction in the AMVP mode.

Figure 9:
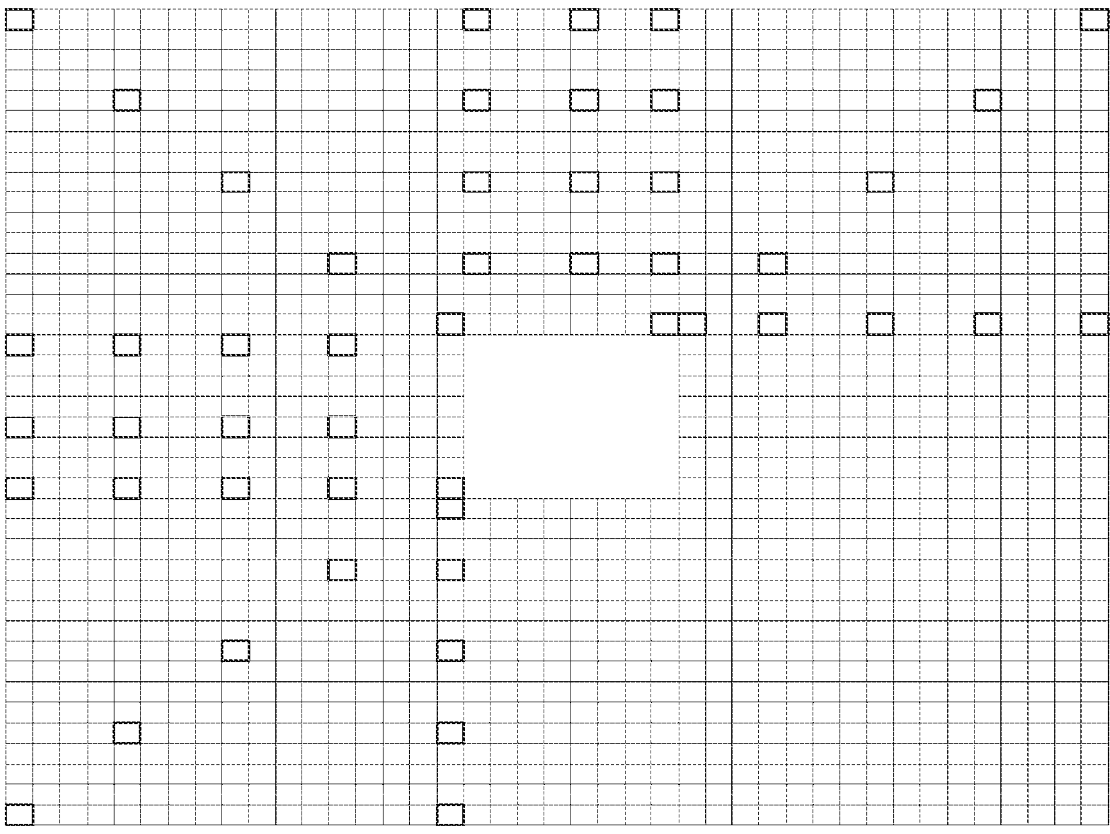
FIG. 9 illustrates an example of available spatial candidates.

FIG. 9 illustrates an example of available spatial candidates.

For example, as described in FIG. 9, it may be possible to use additional candidates to derive the candidates of the secondary list in AMVP mode. In other words, additional spatial candidates are used for the candidates of the secondary list in AMVP mode.

Also, for example, it may be possible to insert other types of candidates that are typically inserted into the merge list. For example, HMVP candidates and/or other appropriate candidates that that may be added to the secondary AMVP list are considered.

Also, for example, it may be possible to parse an indication of a secondary AMVP list at the slice/CTU and or CU level. For example, a use of the secondary AMVP may be signaled in the SPS. For example, flag information related to the use of the secondary AMVP may be signaled in the SPS. For example, a syntax element sps_secondary_merge_list may be parsed. Here, when the flag information is equal to 0, it may indicate that the secondary AMVP cannot be used and when the flag information equal to 1, it may indicate that the secondary AMVP is used for all pictures referring to the SPS in the CLVS.

Also, for example, additional controls may be present to govern the operation of the secondary AMVP during the decoding process. For example, a CTU/CU level switch may be present a flag present at the CTU may indicate whether the CUs within the CTU use a secondary AMVP. Here, when the CTU level flag is true, additional detail information such as the number of candidates may also be parsed at the CU level.

Also, a PH/CU level switch may be present. For example, when the PH/CU level switch may be present, an initial flag indicating whether all CUs are the PH may have a secondary AMVP. When the SML flag at the PH level is true, additional detail information may be parsed at the CU level.

As an example, the concept of a secondary list for IBC-AMVP may also be applied to the IBC case. For example, IBC-AMVP mode uses only two spatial candidates when in IBC-AMVP mode of VVC. That is, A1 and B1 are used, and the candidate index is signaled using mvp_10_flag. Accordingly, it may be possible to use a secondary list of additional spatial candidates and/or other suitable candidates.

Figure 10:
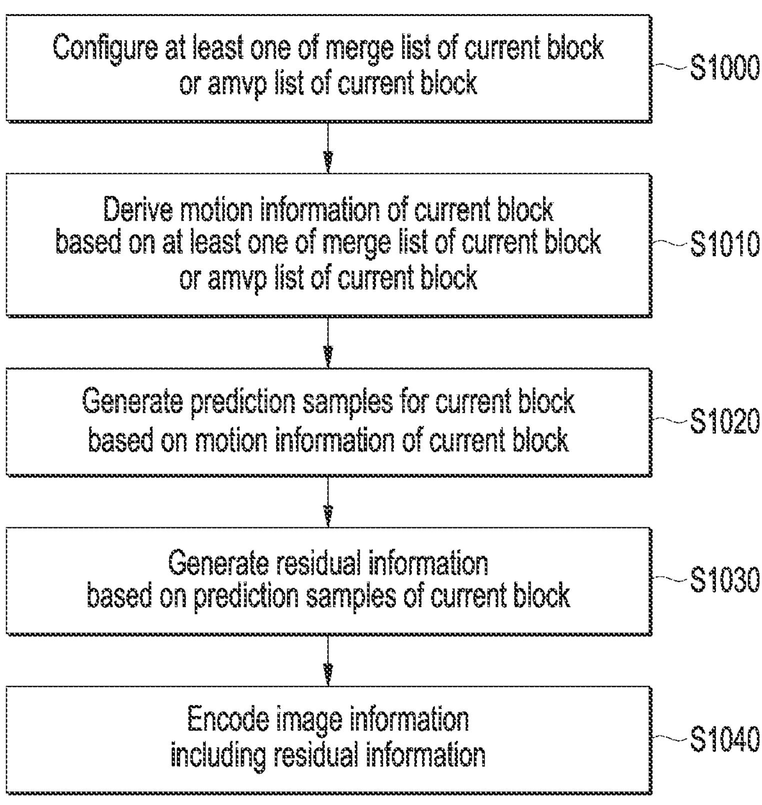
FIG. 10 and FIG. 11 schematically show an example of a video/image encoding method and related components according to embodiment(s) of the present document.
Figure 11:
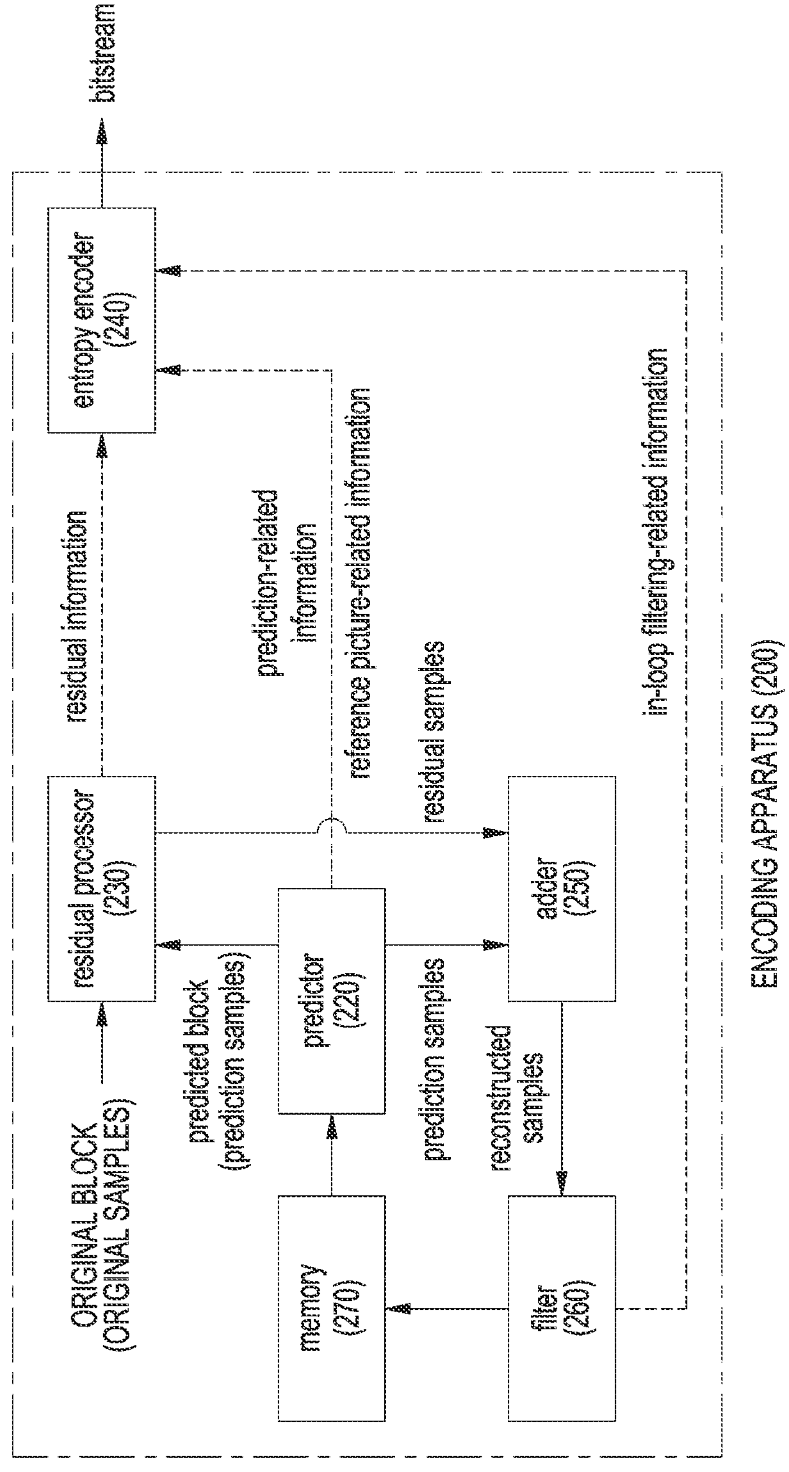

FIG. 10 and FIG. 11 schematically show an example of a video/image encoding method and related components according to embodiment(s) of the present document.

The method disclosed in FIG. 10 may be performed by the encoding apparatus disclosed in FIG. 2 or FIG. 10. Specifically, for example, S1000 to S1020 of FIG. 10 may be performed by the predictor 220 of the encoding apparatus, S1030 of FIG. 10 may be performed by the residual processor 230 of the encoding apparatus, S1040 of FIG. 10 may be performed by the entropy encoder 240 of the encoding apparatus. Also, although not shown in FIG. 10, the process of generating residual samples based on prediction samples for the current block may be performed by the residual processor 230 of the encoding apparatus, and the process of generating a bitstream from residual information or prediction-related information may be performed by the entropy encoder 240 of the encoding apparatus. The method disclosed in FIG. 10 may include the embodiments described above in the present document.

Referring to FIG. 10, the encoding apparatus configures at least one of a merge list of the current block or an AMVP list of the current block (S1000). For example, the encoding apparatus may configure at least one of the merge list of the current block or the AMVP list of the current block according to the above-described embodiment.

For example, the merge list may include at least one of a primary merge list or an SML. Also, for example, the AMVP list may include at least one of a primary AMVP list or a secondary AMVP list.

For example, in the present document, a merge list may be called a merge candidate list. Also, a primary merge list may be called a primary merge candidate list, and an SML may be called a secondary merge candidate list. Also, for example, an AMVP list may be called an AMVP candidate list. Also, a primary AMVP list may be called a primary AMVP candidate list, and a secondary AMVP list may be called a secondary AMVP candidate list.

In addition, for example, the SML may include at least one of a regular merge candidate, an affine merge candidate, or a GPM merge candidate. In other words, the SML may be used for the regular merge, the affine merge or the GPM merge.

The encoding apparatus derives motion information of the current block based on at least one of the merge list of the current block or the AMVP list of the current block (S1010). For example, the encoding apparatus may derive motion information of the current block based on the at least one of the merge list of the current block or the AMVP list of the current block according to the above-described embodiment.

For example, motion information of the current block may be derived based on the SML in the merge list. Also, motion information of the current block may be derived based on the AMVP list. For example, when a value of merge flag information is equal to 1, motion information of the current block may be derived based on the SML, and when the value of merge flag information is equal to 0, motion information of the current block may be derived based on the MVP list. Here, the AMVP list may include at least one of the primary AMVP list or the secondary AMVP list. Therefore, motion information of the current block may be derived based on the at least one of the primary AMVP list or the secondary AMVP list.

The encoding apparatus generates a prediction sample for the current block based on motion information of the current block (S1020). For example, the encoding apparatus may generate a prediction sample for the current block based on the motion information of the current block according to the above-described embodiment.

The encoding apparatus generates residual information based on prediction samples for the current block (S1030). For example, the encoding apparatus may generate residual information based on the prediction samples for the current block according to the above-described embodiment.

The encoding apparatus encodes image information including the residual information (S1040). For example, the encoding apparatus may encode the image information including the residual information according to the above-described embodiment.

Also, for example, the image information may include a SPS. For example, the SPS may include first flag information related to the SML. Here, the first flag information may be related to whether the SML is used for the current picture which is referring to the SPS. For example, when a value of the first flag information is equal to 1, it may indicate that the SML is used for the current picture referring to the SPS, and when the value of the first flag information is equal to 0, it may indicate that the SML is not used. GPM merge. In addition, the first flag information may be a syntax element sps_secondary_merge_list.

Also, for example, the image information may include information on a CTU. For example, the information on the CTU may include second flag information related to the SML, and the second flag information may be related to whether the SML is used for CUs in the CTU.

Also, the image information may include information on a CU. For example, information related to the number of candidates in the SML may be included in the information on CUs based on the second flag information. In other words, the second flag information may be present at a CTU level and when the second flag information is true, information related to the number of candidates may be parsed at a CU level.

Also, for example, the image information may include PH information. For example, the PH information may include third flag information related to the SML, and the third flag information may be related to whether the SML is used for CUs in the CTU.

Also, the image information may include information on a CU. For example, information related to the number of candidates in the SML may be included in the information on CUs based on the third flag information. In other words, the third flag information may be present at a PH level and when the third flag information is true, information related to the number of candidates may be signaled at a CU level.

Also, for example, the image information may include a SPS. For example, information related to the number of candidates in the SML may be included in the SPS. In other words, the information related to the number of candidates in the SML may be signaled at the SPS. Here, the information related to the number of candidates in the SML may be related to the maximum number of candidates in the SML. Also, the information related to the number of candidates in the SML may be signaled at a picture header, a slice header, a CTU, or a CU level etc.

Also, the number of candidates in the SML may be fixed. Also, the number of candidates in the SML may be derived based on the size of the current block or whether a neighboring block of the current block is available. Also, the number of candidates in the SML may be derived based on a prediction mode of neighboring blocks of the current block or whether motion information of the neighboring blocks of the current block is available.

Also, for example, the image information may include information on a SPS and the number of candidates in the SML. For example, information on the number of candidates in the SML may include information on a delta value of the number of the candidates. In other words, the number of candidates in the SML may be derived based on the delta value of the number of candidates in the SML. Also, based on that information on the delta value of the number of candidates is included in the SPS, the information on the delta value of the number of candidates may be fixed-length binarized. Also, when the number of candidates is parsed from a CTU, CU, slice header, and/or picture header level, the number of candidates in the SML may vary.

Also, for example, the image information may include merge index information. For example, when the merge index information indicates the candidates in the SML, the merge index information may be coded based on merge index differences and/or the number of candidates in the primary merge list. Also, the merge index information may be context-adaptively coded. Here, the number of contexts to be used may be determined using block statistics or various methods. For example, in the case of block statistics, block dimensions, motion, available motion information, and the like may be taken into consideration.

Also, for example, the SML may be used with spatial merge candidates, temporal merge candidates, or history-based motion vector prediction (HMVP) candidates.

For example, a larger number of additional spatial candidates than the number of spatial candidates currently considered in VVC may be taken into consideration. Here, the additional spatial merge candidates may be taken into consideration in increasing order of CU distance from a CTU boundary. Also, the additional spatial merge candidates may be derived based on blocks that are in a single direction with respect to the current block. As described above, when blocks in a single direction are taken into consideration, efficiency in generating a merge list can be improved.

For example, a larger number of additional temporal candidates than the number of spatial candidates currently considered in VVC may be taken into consideration. In other words, after availability evaluation, the additional temporal merge candidates may be used for the secondary merge candidate list.

For example, a HMVP table may be extended, and the additional candidates may be added after the spatial candidates.

Also, for example, the additional spatial merge candidates may be re-ordered based on template matching cost. Alternatively, the additional spatial merge candidates may be re-ordered by considering SAD, MR-SAD, etc.

Also, the additional spatial merge candidates may be divided into candidate groups, and the divided candidates may be re-ordered using the above-described method. For example, the secondary merge candidate list may be divided into three groups, and candidates of the divided three groups may be re-ordered based on template matching cost. Here, the secondary merge candidate list may be divided into any number of groups other than three.

Also, for example, the image information may include merge flag information. For example, the merge flag information may indicate whether a merge mode is applied to the current block. Here, the merge flag information may be a syntax element general_merge_flag.

For example, the AMVP list may include at least one of the primary AMVP list and the secondary AMVP list, and motion information of the current block may be derived based on the secondary AMVP list. For example, based on that the merge flag information has a value of 0, motion information of the current block may be derived based on the secondary AMVP list.

Also, in case of the secondary AMVP list, the additional spatial candidates may be considered as described above. For example, a larger number of additional spatial candidates than the number of spatial candidates currently considered in VVC may be taken into consideration. Here, the additional spatial candidates can be derived based on blocks presenting in a single direction with respect to the current block as described above.

Also, for example, the image information may include a SPS. For example, the SPS may include first flag information related to the secondary AMVP list. Here, the first flag information may be related to whether the AMVP list is used for the current picture referring to the SPS. For example, when the value of the first flag information is equal to 1, it may indicate that the secondary AMVP list is used for the current for the current picture referring to the SPS, and when the value of the first flag information is equal to 0, it may indicate that the secondary AMVP list is not used.

Also, for example, the image information may include information on a CTU. For example, the information on the CTU may include second flag information related to the secondary AMVP list, and the second flag information may be related to whether the SML is used for CUs in the CTU.

Also, the image information may include information on a CU. For example, information related to the number of candidates in the secondary AMVP list may be included in the information on CUs based on the second flag information. In other words, the second flag information may be present at a CTU level and when the second flag information is true, information on the number of candidates may be signaled at a CU level.

Also, for example, the image information may include PH information. For example, the PH information may include third flag information related to the secondary AMVP list, and the third flag information may be related to whether the secondary AMVP list is used for CUs in the CTU.

Also, the image information may include information on a CU. For example, information related to the number of candidates in the secondary AMVP list may be included in the information on CUs based on the third flag information. In other words, the third flag information may be present at a PH level and when the third flag information is true, information on the number of candidates may be signaled at a CU level.

Also, for example, a secondary list may be used for IBC-AMVP. For example, in the case of IBC-AMVP of current VVC, only two spatial candidates are used. In other words, using only A1 and B1 which are neighboring blocks of the current block, index information of corresponding blocks is signaled using mvp_10_flag. Therefore, when a secondary list for IBC-AMVP is used, additional spatial candidates or other appropriate candidates may be used. Here, the other appropriate candidates may include temporal candidates, HMVP candidates, and/or the like.

Meanwhile, the image information may include prediction-related information of the current block. The prediction-related information may include information on an inter prediction mode or an intra prediction mode for the current block. The decoding apparatus may perform inter prediction or intra prediction and derive prediction samples for the current block based on the prediction information received through the bitstream.

Figure 12:
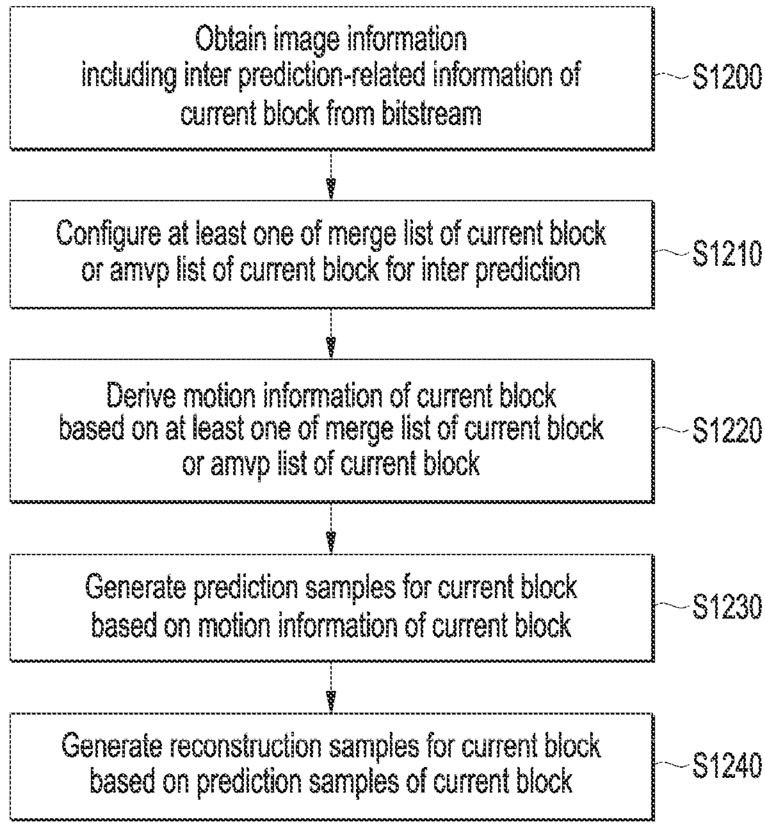
FIG. 12 and FIG. 13 schematically show an example of a video/image decoding method and related components according to embodiment(s) of the present document.
Figure 13:
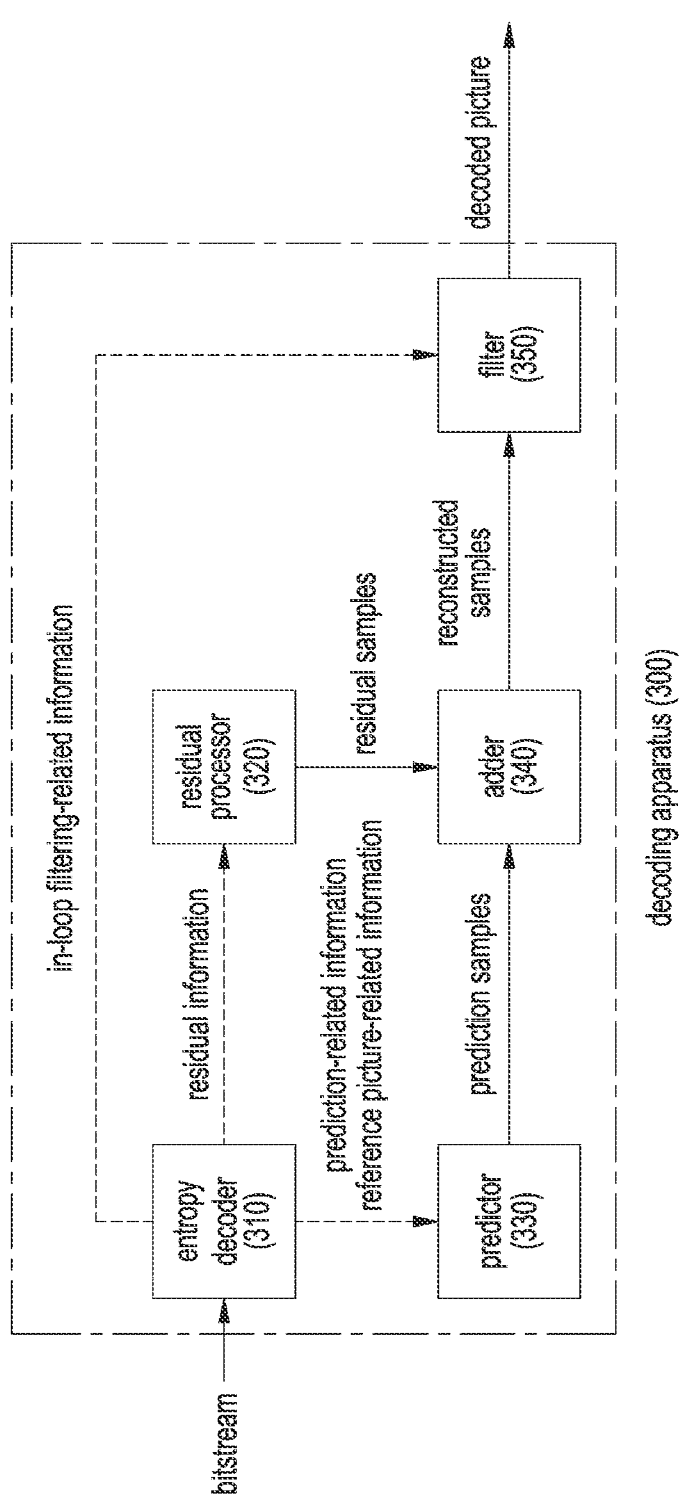

FIG. 12 and FIG. 13 schematically show an example of a video/image decoding method and related components according to embodiment(s) of the present document.

The method disclosed in FIG. 12 may be performed by the decoding apparatus disclosed in FIG. 3 or FIG. 13. Specifically, for example, S1200 of FIG. 12 may be performed by the entropy decoder 310 of the decoding apparatus, S1210 to S1230 of FIG. 12 may be performed by the predictor 330 of the decoding apparatus, S1240 of FIG. 12 may be performed by the adder 340 of the encoding apparatus. Also, although not shown in FIG. 12, the process of deriving residual samples may be performed by the residual processor 320 of the decoding apparatus. The method disclosed in FIG. 12 may include the embodiments described above in the present document.

Referring to FIG. 12, the decoding apparatus obtains image information including inter prediction relation information on the current block from the bitstream (S1200). For example, the decoding apparatus may obtain image information including inter prediction relation information on the current block from the bitstream according to the above-described embodiment.

The decoding apparatus configures at least one of a merge list of the current block or an AMVP list of the current block (S1210). For example, the decoding apparatus may configure at least one of the merge list of the current block or the secondary AMVP list of the current block according to the above-described embodiment.

For example, the merge list may include at least one of a primary merge list or an SML. Also, for example, the AMVP list may include at least one of a primary AMVP list or a secondary AMVP list.

Also, for example, the SML may include at least one of a regular merge candidate, a affine merge candidate or the GPM merge candidate. In other words, the SML may be used for a regular merge, an affine merge or a GPM merge.

Also, for example, the image information may include a SPS. For example, the SPS may include first flag information related to the SML. Here, the first flag information may be related to whether the SML is used for the current picture which is referring to the SPS. For example, when the value of the first flag information is equal to 1, it may indicate that the SML is used for the current picture referring to the SPS, and when the value of the first flag information is equal to 0, it may indicate that the SML is not used. In addition, the first flag information may be a syntax element sps_secondary_merge_list.

Also, for example, the image information may include information on a CTU. For example, the information on the CTU may include second flag information related to the SML, and the second flag information may be related to whether the SML is used for CUs in the CTU.

Also, the image information may include information on a CU. For example, information related to the number of candidates in the SML may be included in the information on CUs based on the second flag information. In other words, the second flag information may be present at a CTU level and when the second flag information is true, information related to the number of candidates may be parsed at a CU level.

Also, for example, the image information may include PH information. For example, the PH information may include third flag information related to the SML, and the third flag information may be related to whether the SML is used for CUs in the CTU.

Also, the image information may include information on a CU. For example, information related to the number of candidates in the SML may be included in the information on CUs based on the third flag information. In other words, the third flag information may be present at a PH level and when the third flag information is true, information related to the number of candidates may be parsed at a CU level.

Also, for example, the image information may include a SPS. For example, information related to the number of candidates in the SML may be included in the SPS. In other words, the information related to the number of candidates in the SML may be signaled at the SPS. Here, the information related to the number of candidates in the SML may be related to the maximum number of candidates in the SML. Also, the information related to the number of candidates in the SML may be signaled at a picture header, a slice header, a CTU, or a CU level etc.

Also, the number of candidates in the SML may be fixed. Also, the number of candidates in the SML may be derived based on the size of the current block or whether a neighboring block of the current block is available. Also, the number of candidates in the SML may be derived based on a prediction mode of neighboring blocks of the current block or whether motion information of the neighboring blocks of the current block is available.

Also, for example, the image information may include information on a SPS and the number of candidates in the SML. For example, information on the number of candidates in the SML may include information on a delta value of the number of the candidates. In other words, the number of candidates in the SML may be derived based on the delta value of the number of candidates in the SML. Also, based on that the information on the delta value of the number of candidates is included in the SPS, the information on the delta value of the number of candidates may be fixed-length binarized. Also, when the number of candidates is parsed from a CTU, CU, slice header, and/or picture header level, the number of candidates in the SML may vary.

Also, for example, the image information may include merge index information. For example, when the merge index information indicates the candidates in the SML, the merge index information may be coded based on merge index differences and/or the number of candidates in the primary merge list. Also, the merge index information may be context-adaptively coded. Here, the number of contexts to be used may be determined using block statistics or various methods. For example, in the case of block statistics, block dimensions, motion, available motion information, and the like may be taken into consideration.

Also, for example, the SML may be used with spatial merge candidates, temporal merge candidates, or HMVP candidates.

For example, a larger number of additional spatial candidates than the number of spatial candidates currently considered in VVC may be taken into consideration. Here, the additional spatial merge candidates may be taken into consideration in increasing order of CU distance until reaching a CTU boundary. Also, the additional spatial merge candidates may be derived based on blocks that are in a single direction with respect to the current block. As described above, when blocks in a single direction are taken into consideration, efficiency in generating a merge list can be improved.

For example, a larger number of additional temporal candidates than the number of spatial candidates currently considered in VVC may be taken into consideration. In other words, after availability evaluation, the additional temporal merge candidates may be used for the secondary merge candidate list.

For example, a HMVP table may be extended, and the additional candidates may be added after the spatial candidates.

Also, for example, the additional spatial merge candidates may be re-ordered based on template matching cost. Alternatively, the additional spatial merge candidates may be re-ordered by considering SAD, MR-SAD, etc.

Also, the additional spatial merge candidates may be divided into candidate groups, and the divided candidates may be re-ordered using the above-described method. For example, the secondary merge candidate list may be divided into three groups, and candidates of the divided three groups may be re-ordered based on template matching cost. Here, the secondary merge candidate list may be divided into any number of groups other than three.

Also, for example, the image information may include merge flag information. For example, the merge flag information may indicate whether a merge mode is applied to the current block. Here, the merge flag information may be a syntax element general_merge_flag.

For example, motion information of the current block may be derived based on the AMVP list. For example, based on that a value of the merge flag information is equal to 0, the motion information of the current block may be derived based on the AMVP list. For example, the AMVP list may include at least one of a primary AMVP list or a secondary AMVP list. Accordingly, motion information of the current block may be derived based on the at least one of the primary AMVP list or the secondary AMVP list.

Also, in case of the secondary AMVP list, the additional spatial candidates may be considered as described above. For example, a larger number of additional spatial candidates than the number of spatial candidates currently considered in VVC may be taken into consideration. Here, the additional spatial candidates can be derived based on blocks presenting in a single direction with respect to the current block as described above.

Also, for example, the image information may include a SPS. For example, the SPS may include first flag information related to the secondary AMVP list. Here, the first flag information may be related to whether the AMVP list is used for the current picture referring to the SPS. For example, when the value of the first flag information is equal to 1, it may indicate that the secondary AMVP list is used for the current for the current picture referring to the SPS, and when the value of the first flag information is equal to 0, it may indicate that the secondary AMVP list is not used.

Also, for example, the image information may include information on a CTU. For example, the information on the CTU may include second flag information related to the secondary AMVP list, and the second flag information may be related to whether the SML is used for CUs in the CTU.

Also, the image information may include information on a CU. For example, information related to the number of candidates in the secondary AMVP list may be included in the information on CUs based on the second flag information. In other words, the second flag information may be present at a CTU level and when the second flag information is true, information on the number of candidates may be parsed at a CU level.

Also, for example, the image information may include PH information. For example, the PH information may include third flag information related to the secondary AMVP list, and the third flag information may be related to whether the secondary AMVP list is used for CUs in the CTU.

Also, the image information may include information on a CU. For example, information related to the number of candidates in the secondary AMVP list may be included in the information on CUs based on the third flag information. In other words, the third flag information may be present at a PH level and when the third flag information is true, information on the number of candidates may be parsed at a CU level.

Also, for example, a secondary list may be used for IBC-AMVP. For example, in the case of IBC-AMVP of current VVC, only two spatial candidates are used. In other words, using only A1 and B1 which are neighboring blocks of the current block, index information of corresponding blocks is signaled using mvp_10_flag. Therefore, when a secondary list for IBC-AMVP is used, additional spatial candidates or other appropriate candidates may be used.

Here, the other appropriate candidates may include temporal candidates, HMVP candidates, and/or the like.

Meanwhile, the image information may include prediction-related information of the current block. The prediction-related information may include information on an inter prediction mode or an intra prediction mode for the current block. The decoding apparatus may perform inter prediction or intra prediction and derive prediction samples for the current block based on the prediction information received through the bitstream.

The decoding apparatus derives motion information for the current block based on at least one of a merge list of the current block or an AMVP list of the current block (S1220). For example, the decoding apparatus may derive the motion information for the current block based on at least one of a merge list of the current block or an AMVP list of the current block according to the above-described embodiment.

For example, the motion information for the current block may be derived based on the SML in the merge list. Also, the motion information on the current block may be derived based on the AMVP list. For example, when a value of the merge flag information is equal to 1, the motion information for the current block may derived based on the SML and when the value of the merge flag information is equal to 0, the motion information on the current block may derived based on the AMVP list.

The decoding apparatus generates prediction samples for the current block based on the motion information for the current block (S1230). For example, the decoding apparatus may generate prediction samples on the current block based on the motion information for the current block according to the above-described embodiment.

The decoding apparatus generates reconstruction samples for the current block based on the prediction samples for the current block (S1240). For example, the decoding apparatus may generate the reconstruction samples for the current block based on the prediction samples for the current block according to the above-described embodiment.

According to the present document described above, inter coding efficiency can be improved using the SML or the secondary AMVP list. For example, with the use of the SML, the number of candidates in a merge list is increased, and thus more motion information may be used. For this reason, the accuracy of inter prediction can be improved. Also, with the use of the secondary AMVP list, the number of AMVP candidates is increased, and thus more motion information may be used. For this reason, the accuracy of inter prediction can be improved. In addition, overall coding efficiency can be improved by efficiently signaling information on the SML or information on the secondary AMVP list.

When there is a residual sample for the current block, the decoding apparatus may receive residual-related information of the current block. The residual-related information may include a transform coefficient for residual samples. The decoding apparatus may derive residual samples (or a residual sample array) for the current block based on the residual information. Specifically, the decoding apparatus may derive quantized transform coefficients based on the residual information. The quantized transform coefficients may have the form of a one-dimensional (1D) vector based on a coefficient scan order. The decoding apparatus may derive transform coefficients based on a dequantization procedure of the quantized transform coefficients. The decoding apparatus may derive residual samples based on the transform coefficients.

The decoding apparatus may generate reconstruction samples based on (intra) prediction samples and the residual samples and derive a reconstruction block or a reconstruction picture based on the reconstruction samples. Specifically, the decoding apparatus may generate reconstruction samples based on the sum of (intra) prediction samples and residual samples. Subsequently, as described above, the decoding apparatus may apply an in-loop filtering procedure, such as deblocking filtering and/or an SAO procedure, to the reconstruction picture to improve subjective/objective picture quality as necessary.

For example, the decoding apparatus may acquire image information including all or some of the above-described information (or syntax elements) by decoding the bitstream or encoded information. Also, the bitstream or encoded information may be stored in a computer-readable storage medium and cause the above-described decoding method to be performed.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The method according to the above-described embodiments of the present document may be implemented in software form, and the encoding apparatus and/or decoding apparatus according to the present document is, for example, may be included in the apparatus that performs the image processing of a TV, a computer, a smart phone, a set-top box, a display device, etc.

When the embodiments in the present document are implemented in software, the above-described method may be implemented as a module (process, function, etc.) that performs the above-described function. A module may be stored in a memory and executed by a processor. The memory may be internal or external to the processor and may be coupled to the processor by various well-known means. The processor may include an application-specific integrated circuit (ASIC), other chipsets, logic circuits, and/or data processing devices. Memory may include read-only memory (ROM), random access memory (RAM), flash memory, memory cards, storage media, and/or other storage devices. That is, the embodiments described in the present document may be implemented and performed on a processor, a microprocessor, a controller, or a chip. For example, the functional units shown in each figure may be implemented and performed on a computer, a processor, a microprocessor, a controller, or a chip. In this case, information on instructions or an algorithm for implementation may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (i.e., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present document is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (i.e., transmission through the Internet). In addition, a bitstream generated by the encoding method may be stored in a computer-readable recording medium or may be transmitted over wired/wireless communication networks.

In addition, the embodiments of the present document may be implemented with a computer program product according to program codes, and the program codes may be performed in a computer by the embodiments of the present document. The program codes may be stored on a carrier which is readable by a computer.

Figure 14:
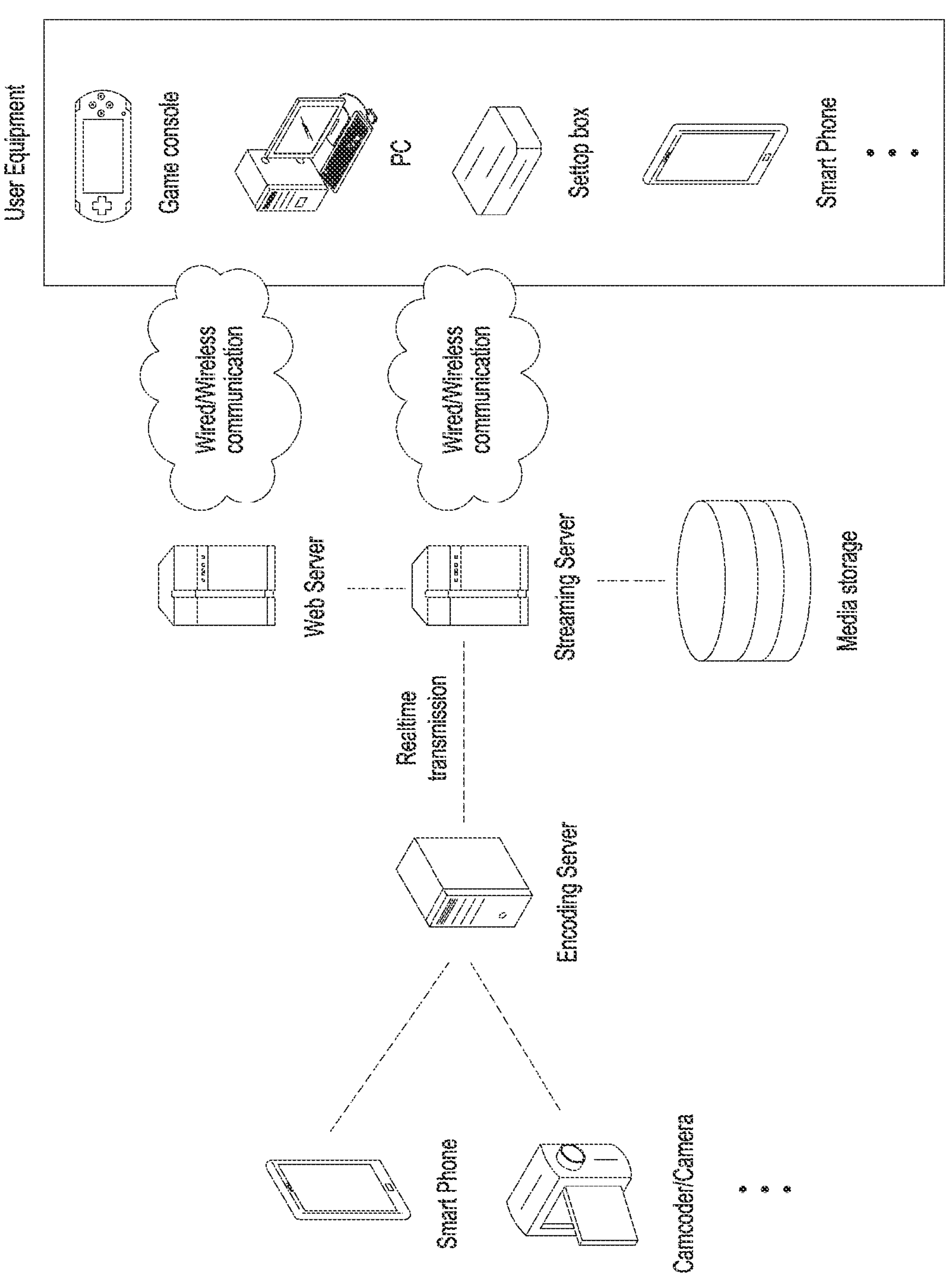
FIG. 14 shows an example of a content streaming system to which embodiments disclosed in the present document may be applied.

FIG. 14 shows an example of a content streaming system to which embodiments disclosed in the present document may be applied.

Referring to FIG. 14, the content streaming system to which the embodiment(s) of the present document is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment (s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

Each server in the content streaming system may be operated as a distributed server, and in this case, data received from each server may be distributed and processed.

The claims described herein may be combined in various ways. For example, the technical features of the method claims of the present document may be combined and implemented as an apparatus, and the technical features of the apparatus claims of the present document may be combined and implemented as a method. In addition, the technical features of the method claim of the present document and the technical features of the apparatus claim may be combined to be implemented as an apparatus, and the technical features of the method claim of the present document and the technical features of the apparatus claim may be combined and implemented as a method.

The invention claimed is:

1. An image decoding method performed by a decoding apparatus, the image decoding method comprising:

obtaining image information including inter prediction-related information of a current block from a bitstream;

configuring at least one of a merge list of the current block and an advanced motion vector prediction (AMVP) list of the current block for inter prediction;

deriving motion information of the current block on the basis of the at least one of the merge list of the current block and the AMVP list of the current block;

generating prediction samples for the current block based on the motion information of the current block; and generating reconstruction samples for the current block based on the prediction samples for the current block, wherein the merge list includes at least one of a primary merge list and a secondary merge list (SML), wherein the image information includes merge index information, and based on the merge index information indicating candidates in the SML, the merge index information is decoded based on a number of candidates in the primary merge list.

2. The image decoding method of claim 1, wherein the SML includes at least one of a regular merge candidate, an affine merge candidate, and a geometric prediction mode (GPM) merge candidate.

3. The image decoding method of claim 1, wherein the image information includes a sequence parameter set (SPS), the SPS includes first flag information related to the SML, and the first flag information is related to whether the SML is used for a current picture referenced by the SPS.

4. The image decoding method of claim 1, wherein the image information includes information on a coding tree unit (CTU), the information on the CTU includes second flag information related to the SML, and the second flag information is related to whether the SML is used for coding units (CUs) in the CTU.

5. The image decoding method of claim 4, wherein the image information includes information on the CUS, and information related to a number of candidates in the SML is included in the information on the CUs on the basis of the second flag information.

6. The image decoding method of claim 4, wherein the image information includes picture header information, the picture header information includes third flag information related to the SML, and the third flag information is related to whether the SML is used for the CUs in the CTU.

7. The image decoding method of claim 6, wherein the image information includes information on the CUs, and information related to a number of candidates in the SML is included in the information on the CUs on the basis of the third flag information.

8. The image decoding method of claim 1, wherein the image information includes a sequence parameter set (SPS), and information related to a number of candidates in the SML is included in the SPS.

9. The image decoding method of claim 1, wherein a number of candidates in the SML is derived on the basis of a size of the current block or whether a neighboring block of the current block is available.

10. The image decoding method of claim 1, wherein the image information includes a sequence parameter set (SPS) and information on a number of candidates in the SML, the information on the number of candidates in the SML includes information on a delta value of the number of candidates, and based on that information on the delta value of the number of candidates is included in the SPS, fixed-length binarization is performed on the information on the delta value of the number of candidates.

11. The image decoding method of claim 1, wherein, based on that the merge index information indicates candidates in the SML, the merge index information is decoded based on information on merge index differences and the number of candidates in the primary merge list.

12. The image decoding method of claim 1, wherein the SML includes at least one of additional spatial merge candidates and additional temporal candidates.

13. The image decoding method of claim 12, wherein the additional spatial merge candidates are derived based on blocks which are in one direction from the current block.

14. The image decoding method of claim 12, wherein the additional spatial merge candidates are re-ordered based on template matching cost.

15. The image decoding method of claim 1, wherein the image information includes merge flag information, the motion information of the current block is derived based on the merge flag information and the AMVP list of the current block, and the AMVP list includes at least one of a primary AMVP list and a secondary AMVP list.

16. The image decoding method of claim 15, wherein the secondary AMVP list is used to derive candidates for an intra block copy (IBC) AMVP mode.

17. An image encoding method performed by an encoding apparatus, the image encoding method comprising:

configuring at least one of a merge list of a current block and an advanced motion vector prediction (AMVP) list of the current block;

deriving motion information of the current block on the basis of the at least one of the merge list of the current block and the AMVP list of the current block;

generating prediction samples for the current block on the basis of the motion information of the current block;

generating residual information based on the prediction samples of the current block; and encoding image information including the residual information, wherein the merge list includes at least one of a primary merge list and a secondary merge list (SML), wherein the image information includes merge index information, and based on the merge index information indicating candidates in the SML, the merge index information is encoded based on a number of candidates in the primary merge list.

18. A non-transitory computer-readable storage medium for storing instructions that, when executed by a processor, cause the processor to perform the image encoding method of claim 17.

19. A method of transmitting data of an image, the method comprising:

generating a bitstream of the image, wherein the bitstream is generated based on configuring at least one of a merge list of a current block and an advanced motion vector prediction (AMVP) list of the current block, deriving motion information of the current block on the basis of the at least one of the merge list of the current block and the AMVP list of the current block, generating prediction samples for the current block on the basis of the motion information of the current block, generating residual information on the basis of the prediction samples of the current block, encoding image information including the residual information; and transmitting the data including the bitstream, wherein the merge list includes at least one of a primary merge list and a secondary merge list (SML), wherein the image information includes merge index information, and based on the merge index information indicating candidates in the SML, the merge index information is encoded based on a number of candidates in the primary merge list.

* * * * *